United States Patent
Lu et al.

(10) Patent No.: US 11,138,034 B2
(45) Date of Patent: Oct. 5, 2021

(54) METHOD AND APPARATUS FOR COLLECTING INFORMATION, AND METHOD AND APPARATUS FOR RELEASING MEMORY

(71) Applicant: HUAWEI TECHNOLOGIES CO., LTD., Guangdong (CN)

(72) Inventors: Yifan Lu, Shenzhen (CN); Haitao Huang, Shanghai (CN); Yongyong Yang, Beijing (CN); Yongjian Chen, Beijing (CN); Mingliang Yi, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 325 days.

(21) Appl. No.: 16/242,363

(22) Filed: Jan. 8, 2019

(65) Prior Publication Data
US 2019/0155641 A1 May 23, 2019

Related U.S. Application Data
(63) Continuation of application No. PCT/CN2018/093302, filed on Jun. 28, 2018.

(30) Foreign Application Priority Data

Oct. 26, 2017 (CN) .......................... 201711013628.5

(51) Int. Cl.
*G06F 9/48* (2006.01)
*G06F 9/445* (2018.01)
(Continued)

(52) U.S. Cl.
CPC ............ *G06F 9/485* (2013.01); *G06F 8/4434* (2013.01); *G06F 9/44505* (2013.01);
(Continued)

(58) Field of Classification Search
CPC ...... G06F 9/485; G06F 9/451; G06F 9/44505; G06F 9/44594; G06F 9/45516;
(Continued)

(56) References Cited

U.S. PATENT DOCUMENTS 5,590,332 A * 12/1996 Baker ................. G06F 12/0253
717/151
6,189,141 B1 * 2/2001 Benitez .................. G06F 8/443
714/E11.209

(Continued)

FOREIGN PATENT DOCUMENTS

| CN | 102521089 A | 6/2012 |
| CN | 104391798 A | 3/2015 |

(Continued)

OTHER PUBLICATIONS

Michael, Hazard Pointers: Safe Memory Reclamation for Lock-Free Objects, IEEE, pp. 491-504 (Year: 2004).*

(Continued)

*Primary Examiner* — Anil Khatri
(74) *Attorney, Agent, or Firm* — Conley Rose, P.C.

(57) ABSTRACT

The method for collecting information includes obtaining, based on a method identifier of the target method, the quantity of times of invoking the target method, recording method information of the target method based on the quantity of times of invoking the target method, a first threshold, and a second threshold, and setting a method status of the target method, the method status is one of a first state and a second state, the first state corresponds to the first threshold, the second state corresponds to the second threshold.

35 Claims, 14 Drawing Sheets

(51) Int. Cl.
*G06F 9/451* (2018.01)
*G06F 11/34* (2006.01)
*G06F 8/41* (2018.01)
*G06F 9/455* (2018.01)

(52) U.S. Cl.
CPC .......... *G06F 9/44594* (2013.01); *G06F 9/451* (2018.02); *G06F 9/45516* (2013.01); *G06F 11/3409* (2013.01); *G06F 2201/81* (2013.01); *G06F 2201/865* (2013.01); *G06F 2201/88* (2013.01); *G06F 2209/482* (2013.01)

(58) Field of Classification Search
CPC ............... G06F 11/3409; G06F 8/4434; G06F 2201/81; G06F 2201/865; G06F 2201/88; G06F 2209/482
USPC ................................................. 717/150–160
See application file for complete search history.

(56) References Cited

U.S. PATENT DOCUMENTS

| | | | |
|---|---|---|---|
| 6,658,652 B1* | 12/2003 | Alexander, III | G06F 9/5016 707/999.202 |
| 6,862,729 B1* | 3/2005 | Kuch | G06F 9/445 717/158 |
| 6,952,821 B2* | 10/2005 | Schreiber | 711/165 |
| 6,971,092 B1* | 11/2005 | Chilimbi | G06F 11/3466 711/118 |
| 7,080,366 B2 | 7/2006 | Kramskoy et al. | |
| 7,293,259 B1* | 11/2007 | Dmitriev | G06F 11/3466 714/E11.207 |
| 7,293,260 B1* | 11/2007 | Dmitriev | G06F 11/3466 714/E11.207 |
| 7,401,324 B1* | 7/2008 | Dmitriev | G06F 8/443 717/130 |
| 7,568,192 B2* | 7/2009 | Mitchell | G06F 11/366 717/127 |
| 7,827,538 B2* | 11/2010 | Trotter | G06F 12/0253 717/127 |
| 8,452,938 B1* | 5/2013 | Tene | G06F 12/0253 711/170 |
| 8,494,832 B2 | 7/2013 | Krishnan et al. | |
| 8,595,446 B2* | 11/2013 | Lev | G06F 9/5016 711/147 |
| 8,725,982 B2* | 5/2014 | Tene | G06F 12/0253 711/170 |
| 8,972,975 B1* | 3/2015 | Rogers | G06F 11/3419 717/175 |
| 9,740,631 B2 | 8/2017 | Shiu et al. | |
| 10,175,964 B2* | 1/2019 | Radigan | G06F 8/4442 |
| 10,228,858 B1* | 3/2019 | Stoakes | G06F 3/067 |
| 10,445,229 B1* | 10/2019 | Kuzmin | G06F 3/0659 |
| 10,496,534 B2* | 12/2019 | Vytiniotis | G06F 12/0261 |
| 10,698,832 B2* | 6/2020 | Lo | G06F 3/068 |
| 10,871,976 B2* | 12/2020 | Yi | G06F 9/45508 |
| 2003/0225917 A1 | 12/2003 | Partamian et al. | |
| 2010/0199265 A1 | 8/2010 | Maybee | |
| 2011/0113405 A1 | 5/2011 | Guerrera et al. | |
| 2015/0095603 A1 | 4/2015 | Kim et al. | |

FOREIGN PATENT DOCUMENTS

| | | |
|---|---|---|
| CN | 106155646 A | 11/2016 |
| CN | 106326137 A | 1/2017 |
| CN | 106502785 A | 3/2017 |
| CN | 107168848 A | 9/2017 |
| EP | 0999498 A2 | 5/2000 |
| EP | 1826668 A1 | 8/2007 |
| EP | 2508997 A1 | 10/2012 |
| EP | 3015983 A1 | 5/2016 |
| JP | 2004005650 A | 1/2004 |
| KR | 20090017586 A | 2/2009 |

OTHER PUBLICATIONS

Szekeres et al, "SoK: EternalWar in Memory", IEEE, pp. 48-62 (Year: 2013).*
Hammer et al, "Memory Management for Self-Adjusting Computation", ACM, pp. 51-60 (Year: 2008).*
Willocx et al "Quantitative Assessment of Performance in Mobile App Development Tools", IEEE, pp. 454-461 (Year: 2015).*
Confalonieri etal, "Mobile Memory Systems", IEEE, pp. 1-7 (Year: 2015).*
Willocx et al "Comparing performance parameters of mobile app development strategies", ACM, pp. 38-47 (Year: 2016).*
Iftode etal, "Improving Release-Consistent Shared Virtual Memory using Automatic Update", IEEE, pp. 14-25 (Year: 1996).*
Dwarkadas et al, "Evaluation of Release Consistent Software Distributed Shared Memory Emerging Network Technology", IEEE, pp. 144-155 (Year: 1993).*
Rivera et al, "Conservative Garbage Collection for General Allocators", ACM, pp. 71-79 (Year: 2000).*
"JProfiler Manual," XP055724633, Retrieved from the Internet: https://web.archive.org/web/20171025194711if_/https://resources.ej-technologies.com/jprofiler/help/doc/help.pdf, Oct. 25, 2017, 307 pages.
Hoelzle, U., "Adaptive Optimization for Self: Reconciling High Performance With Exploratory Programming," XP008053101, Dissertation, Aug. 1, 1994, 181 pages.
Foreign Communication From a Counterpart Application, Canadian Application No. 3029370, Canadian Office Action dated Feb. 18, 2020, 4 pages.

* cited by examiner

METHOD AND APPARATUS FOR COLLECTING INFORMATION, AND METHOD AND APPARATUS FOR RELEASING MEMORY

CROSS-REFERENCE TO RELATED APPLICATIONS

This application is a continuation of International Application No. PCT/CN2018/093302, filed on Jun. 28, 2018, which claims priority to Chinese Patent Application No. 201711013628.5, filed on Oct. 26, 2017. The disclosures of the aforementioned applications are hereby incorporated by reference in their entireties.

TECHNICAL FIELD

The present invention relates to the information processing field, and in particular, to a method and an apparatus for collecting information, and a method and an apparatus for releasing memory.

BACKGROUND

Each application program of an ANDROID operating system runs on an independent a virtual machine in the ANDROID system, ANDROID Runtime (ART) instance. In a running process of an application program, first, an oat file is loaded into a memory for executing machine code in the oat file. When a method that needs to be invoked is not included in the oat file, the ART loads, into the memory (RAM, Random Access Memory), a dex file corresponding to the method, and interprets and executes a bytecode in the dex file by using an interpreter (interpreter of the ART). When a quantity of times of invoking the method satisfies a threshold, method information of the method is recorded to a profile file. When a condition is satisfied (for example, in a standby state with a lock screen and of being charged for four hours), the ART performs AOT (ahead-of-time compilation technology of an ANDROID Java program, Ahead Of Time) compilation on the dex file of the method corresponding to the method information recorded in the profile file, and updates the oat file. This can accelerate starting and running of the program next time.

As can be learned from the foregoing procedure, a code segment of the program mainly includes the machine code obtained through interpretation or compilation. As the program runs, the ART continuously loads, into the memory in a file mapping manner, code in the dex file corresponding to the method to be invoked by the program and code in the oat file. Therefore, memory required by the program also increases continuously. Consequently, as more programs run simultaneously, more memory is consumed, and available memory of the system becomes less.

To reduce consumption of memory of the code segment of the application program, a new important feature Dexlayout is released in an ANDROID O version. When the ART performs AOT compilation on the dex file in a speed-profile form, the ART rearranges and optimizes a layout of the dex file based on information in the profile file, and a new dex file is generated after the layout optimization, where a layout of classes and methods is changed, and hot classes and methods are centralized at a front part, but cold classes and methods are centralized at an end part. In other words, hot content and cold content in the file are processed differently. The Dexlayout centralizes hot spot code. Less code that is infrequently used in the new dex file is mapped to the memory, and occupation of memory by the dex file is optimized.

As can be learned from above, the method information recorded in the profile file exerts great impact on the AOT compilation, but a method for recording the method information to the profile file in the prior art needs to be further optimized.

SUMMARY

In view of the existing technical problem in the prior art, this application provides a method for collecting information.

According to a first aspect, this application provides a method for collecting information. The method includes: when a quantity of times of invoking a target method in a running lifecycle of a target program increases, obtaining, based on a method identifier of the target method, the quantity of times of invoking the target method, where the target program is any program running in the operating system, the target method is any one of at least one method invoked by the target program, and the quantity of times of invoking is used to indicate a current quantity of times of invoking the target method in the running lifecycle of the target program; and recording method information of the target method based on the quantity of times of invoking the target method, a first threshold, and a second threshold, and setting a method status of the target method, where the method status is used to indicate a status of the method invoked by the target program and corresponding to the method status, the method status is a first state or a second state, the first state corresponds to the first threshold, the second state corresponds to the second threshold, the first threshold and the second threshold are positive integers, and the second threshold is greater than 0 and less than the first threshold. Both the first threshold and the second threshold are adjustable, and in an implementation, a threshold adjustment interface may be reserved for adjusting and setting the first threshold and the second threshold based on a user requirement or an application scenario. For a quantity of times of invoking a method, two different thresholds are set. When a quantity of recorded methods increases, the recorded methods can be classified, and information collection can be optimized.

In a possible implementation of the first aspect, the recording method information of the target method based on the quantity of times of invoking the target method, a first threshold, and a second threshold, and setting a method status of the target method includes: determining whether the quantity of times of invoking the target method is greater than the first threshold; if the quantity of times of invoking the target method is greater than the first threshold, recording the method information of the target method and setting the method status of the target method to the first state; otherwise, determining whether the quantity of times of invoking the target method is greater than the second threshold; and if the quantity of times of invoking the target method is greater than the second threshold, recording the method information of the target method and setting the method status of the target method to the second state.

In a possible implementation of the first aspect, the recording method information of the target method based on the quantity of times of invoking the target method, a first threshold, and a second threshold, and setting a method status of the target method includes: determining whether the quantity of times of invoking the target method is greater than the second threshold; if the quantity of times of invoking the target method is greater than the second threshold, determining whether the quantity of times of invoking the target method is greater than the first threshold; and if the quantity of times of invoking the target method is greater than the first threshold, recording the method information of the target method and setting the method status of the target method to the first state; otherwise, recording the method information of the target method and setting the method status of the target method to the second state.

In a possible implementation of the first aspect, before the recording method information of the target method based on the quantity of times of invoking the target method, a first threshold, and a second threshold, and setting a method status of the target method, the method further includes: determining the method status of the target method based on the method identifier of the target method; and based on the determined method status of the target method, the method further includes: if the method status of the target method does not exist, performing the step of recording method information of the target method based on the quantity of times of invoking the target method, a first threshold, and a second threshold, and setting a method status of the target method; or if the method status of the target method is the second state, determining whether the quantity of times of invoking the target method is greater than the first threshold; and if the quantity of times of invoking the target method is greater than the first threshold, setting the method status of the target method from the second state to the first state.

In a possible implementation of the first aspect, the setting a method status of the target method includes: calling a status setting function to write the method identifier of the target method and the corresponding method status into a shared mapping, where the shared mapping is used to record a correspondence between the method identifier and the method status.

In a possible implementation of the first aspect, the determining the method status of the target method based on the method identifier of the target method includes: calling a status return function to obtain the method status of the target method from a shared mapping based on the method identifier of the target method, where the shared mapping is used to record a correspondence between the method identifier and the method status; and determining the method status of the target method based on a result returned by the status return function.

In a possible implementation of the first aspect, the setting the method status of the target method from the second state to the first state includes: calling a status setting function to set the method status of the target method from the second state to the first state.

In a possible implementation of the first aspect, the recording method information of the target method includes: writing the method information of the target method into a profile file corresponding to the target program, where the profile file includes at least one piece of method information. According to this method, the stored method information is classified when the method information stored in the profile file increases.

In a possible implementation of the first aspect, the method further includes: obtaining a start address and an end address of a hot method in the profile file, where the hot method is used to indicate a method corresponding to the method information in the profile file corresponding to the target program; obtaining a start address and an end address of a cold method based on the start address and the end address of the hot method, where the cold method is used to indicate a method that is invoked by the target program and whose corresponding method information is not written into the profile file; and releasing, based on the start address and the end address of the cold method, memory occupied by code of the cold method. Optionally, the hot method is used to indicate a method that corresponds to the method information in the profile file and whose method status is the first state, and the cold method is used to indicate a method that is invoked by the target program and whose corresponding method information is not written into the profile file and a method that corresponds to the method information in the profile file and whose method status is the second state. The memory that is occupied by the code of the cold method and needs to be released can be positioned accurately by using the start address and the end address of the hot method in the profile file; redundantly occupied memory can be released with ensured smooth running of a running program, and a speed of starting a new program can also be increased.

In a possible implementation of the first aspect, the obtaining a start address and an end address of a hot method in the profile file includes: obtaining a method identifier of the hot method; obtaining the start address of the hot method based on the method identifier of the hot method; obtaining a header of the hot method based on the start address of the hot method; calculating, based on the header of the hot method, a size of memory occupied by code of the hot method; and obtaining the end address of the hot method based on the size of the memory occupied by the code of the hot method and the start address of the hot method. This is only a technical solution to obtaining a start address and an end address of a method according to an embodiment of this application. Specific obtaining of a start address and an end address of a method is not limited in this embodiment of this application.

In a possible implementation of the first aspect, after the obtaining a method identifier of the hot method, the method includes: storing the method identifier of the hot method in a first set; the obtaining the start address of the hot method based on the method identifier of the hot method includes: traversing the first set to obtain the start address of the hot method based on the method identifier of the hot method, and storing the start address of the hot method in a second set based on a value of the start address; and after the obtaining the end address of the hot method based on the size of the memory occupied by the code of the hot method and the start address of the hot method, the method includes: storing the end address of the hot method in a third set based on a value of the end address. Obtained start addresses and end addresses of all hot methods are stored in corresponding sets based on values of the addresses, so that corresponding start addresses and end addresses are retrieved through traversal.

In a possible implementation of the first aspect, the obtaining a start address and an end address of a cold method based on the start address and the end address of the hot method includes: obtaining the start address and the end address of the cold method based on the second set and the third set.

In a possible implementation of the first aspect, the releasing, based on the start address and the end address of the cold method, memory occupied by code of the cold method includes: calculating, based on the start address and the end address of the cold method, a size of the memory occupied by the code of the cold method; determining a cold method memory page based on a size of a single memory page in the operating system, the size of the memory occupied by the code of the cold method, and the start address and the end address of the cold method, where the cold method memory page is a memory page on which code segment memory is fully occupied by the cold method; and releasing the cold method memory page.

In a possible implementation of the first aspect, the method further includes: calling a first function to advise a kernel of the operating system to release memory occupied by code of the method invoked by the target program; obtaining a start address and an end address of a hot method, where the hot method is used to indicate a method corresponding to the method information in the profile file or a method that corresponds to the method information in the profile file and whose method status is the first state; and releasing, based on a size of memory occupied by code of the hot method and the start address and the end address of the hot method, code segment memory occupied by a method invoked by the target program. Through avoiding releasing a memory page occupied by the hot method and releasing a cold method memory page that violates access, redundantly occupied memory can be released with ensured smooth running of a running program, and a speed of starting a new program can also be increased.

In a possible implementation of the first aspect, the obtaining a start address and an end address of a hot method includes: obtaining a method identifier of the hot method; obtaining the start address of the hot method based on the method identifier of the hot method; obtaining a header of the hot method based on the start address of the hot method; calculating, based on the header of the hot method, the size of the memory occupied by the code of the hot method; and obtaining the end address of the hot method based on the size of the memory occupied by the code of the hot method and the start address of the hot method.

In a possible implementation of the first aspect, the releasing, based on a size of memory occupied by code of the hot method and the start address and the end address of the hot method, code segment memory occupied by a method invoked by the target program includes: determining, based on the size of the memory occupied by the code of the hot method and a size of a single memory page in the operating system, whether page spanning exists in the hot method, where the page spanning is used to indicate that a method occupies code segment memory of at least two memory pages; and if page spanning exists in the hot method, accessing the start address, an intermediate address, and the end address of the hot method, and releasing a memory page that is not accessed and that is occupied by a method invoked by the target program, where the intermediate address is used to indicate an address at a distance of N single memory pages in the operating system from the start address in the same method, and N is a positive integer; or if page spanning does not exist in the hot method, accessing the start address and the end address of the hot method, and releasing a memory page that is not accessed and that is occupied by a method invoked by the target program.

In a possible implementation of the first aspect, the method further includes: performing ahead-of-time compilation technology AOT compilation on the method information of the method whose method status is the first state in the profile file.

According to the method provided in this embodiment of this application, method information of methods that are invoked frequently can be collected, and in addition, methods corresponding to collected method information are classified. The collection of method information of methods is optimized, and more method information of invoked methods is collected without increasing a workload of compiling the method information into machine-recognizable code. In addition, a specific memory page that is occupied by the code of the cold method and needs to be released can be positioned. Therefore, the memory can be accurately released with ensured smooth running of the program, or the memory occupied by the code of the cold method (a method that is invoked relatively infrequently) is accurately released with maintained smooth running of the program.

According to a second aspect, this application provides an apparatus for collecting information, where the apparatus includes: an invoking time quantity obtaining module, configured to: when a quantity of times of invoking a target method in a running lifecycle of a target program increases, obtain, based on a method identifier of the target method, the quantity of times of invoking the target method, where the target program is any program running in an operating system, the target method is any one of at least one method invoked by the target program, and the quantity of times of invoking is used to indicate a current quantity of times of invoking the target method in the running lifecycle of the target program; a recording module, configured to record method information of the target method based on a first threshold, a second threshold, and the quantity of times of invoking the target method that is obtained by the invoking time quantity obtaining module, where the first threshold and the second threshold are positive integers, and the second threshold is greater than 0 and less than the first threshold; and a status setting module, configured to set a method status of the target method based on the first threshold, the second threshold, and the quantity of times of invoking the target method that is obtained by the invoking time quantity obtaining module, where the method status is used to indicate a status of the method invoked by the target program and corresponding to the method status, the method status is a first state or a second state, the first state corresponds to the first threshold, and the second state corresponds to the second threshold.

In a possible implementation of the second aspect, the apparatus further includes a first determining module and a second determining module, where the first determining module is configured to determine whether the quantity of times of invoking the target method is greater than the first threshold; the second determining module is configured to: when the first determining module determines that the quantity of times of invoking the target method is less than or equal to the first threshold, determine whether the quantity of times of invoking the target method is greater than the second threshold; the recording module is specifically configured to: when the first determining module determines that the quantity of times of invoking the target method is greater than the first threshold and the second determining module determines that the quantity of times of invoking the target method is greater than the second threshold, record the method information of the target method; and the status setting module is specifically configured to: when the first determining module determines that the quantity of times of invoking the target method is greater than the first threshold, set the method status of the target method to the first state, and when the second determining module determines that the quantity of times of invoking the target method is greater than the second threshold, set the method status of the target method to the second state.

In a possible implementation of the second aspect, the apparatus further includes a third determining module and a fourth determining module, where the third determining module is configured to determine whether the quantity of times of invoking the target method is greater than the second threshold; the fourth determining module is configured to: when the third determining module determines that the quantity of times of invoking the target method is greater than the second threshold, determine whether the quantity of times of invoking the target method is greater than the first threshold; the recording module is specifically configured to: when the third determining module determines that the quantity of times of invoking the target method is greater than the second threshold, record the method information of the target method; and the status setting module is specifically configured to: when the fourth determining module determines that the quantity of times of invoking the target method is greater than the first threshold, set the method status of the target method to the first state, and when the fourth determining module determines that the quantity of times of invoking the target method is less than or equal to the first threshold, set the method status of the target method to the second state.

In a possible implementation of the second aspect, the apparatus further includes a status determining module, configured to determine the method status of the target method based on the method identifier of the target method.

In a possible implementation of the second aspect, the apparatus further includes a fifth determining module, where the fifth determining module is configured to: when the status determining module determines that the method status of the target method is the second state, determine whether the quantity of times of invoking the target method is greater than the first threshold; the recording module is specifically configured to: when the status determining module determines that the method status of the target method does not exist, record the method information of the target method; and the status setting module is specifically configured to: when the status determining module determines that the method status of the target method does not exist, set the method status of the target method, and when the fifth determining module determines that the quantity of times of invoking the target method is greater than the first threshold, set the method status of the target method from the second state to the first state.

In a possible implementation of the second aspect, the status setting module is specifically configured to call a status setting function to write the method identifier of the target method and the corresponding method status into a shared mapping, where the shared mapping is used to record a correspondence between the method identifier and the method status.

In a possible implementation of the second aspect, the status determining module is specifically configured to: call a status return function to obtain the method status of the target method from a shared mapping based on the method identifier of the target method, where the shared mapping is used to record a correspondence between the method identifier and the method status; and determine the method status of the target method based on a result returned by the status return function.

In a possible implementation of the second aspect, the status setting module is specifically configured to call a status setting function to set the method status of the target method from the second state to the first state.

In a possible implementation of the second aspect, the recording module is specifically configured to write the method information of the target method into a profile file corresponding to the target program, where the profile file includes at least one piece of method information.

In a possible implementation of the second aspect, the apparatus further includes: a first hot method address obtaining module, configured to obtain a start address and an end address of a hot method in the profile file, where the hot method is used to indicate a method corresponding to the method information in the profile file corresponding to the target program; a cold method address calculation module, configured to calculate a start address and an end address of a cold method based on the start address and the end address of the hot method that are obtained by the first hot method address obtaining module, where the cold method is used to indicate a method that is invoked by the target program and whose corresponding method information is not written into the profile file; and a first memory releasing module, configured to release, based on the start address and the end address of the cold method that are obtained by the cold method address calculation module, memory occupied by code of the cold method. Optionally, the hot method is used to indicate a method that corresponds to the method information in the profile file and whose method status is the first state, and the cold method is used to indicate a method that is invoked by the target program and whose corresponding method information is not written into the profile file and a method that corresponds to the method information in the profile file and whose method status is the second state.

In a possible implementation of the second aspect, the first hot method address obtaining module is specifically configured to: obtain a method identifier of the hot method; obtain the start address of the hot method based on the method identifier of the hot method; obtain a header of the hot method based on the start address of the hot method; calculate, based on the header of the hot method, a size of memory occupied by code of the hot method; and obtain the end address of the hot method based on the size of the memory occupied by the code of the hot method and the start address of the hot method.

In a possible implementation of the second aspect, the first hot method address obtaining module is specifically configured to: after obtaining the method identifier of the hot method, store the method identifier of the hot method in a first set; traverse the first set to obtain the start address of the hot method based on the method identifier of the hot method, and store the start address of the hot method in a second set based on a value of the start address; and after obtaining the end address of the hot method based on the size of the memory occupied by the code of the hot method and the start address of the hot method, store the end address of the hot method in a third set based on a value of the end address.

In a possible implementation of the second aspect, the cold method address calculation module is specifically configured to calculate the start address and the end address of the cold method based on the second set and the third set that are obtained by the first hot method address obtaining module.

In a possible implementation of the second aspect, the apparatus further includes a cold method memory page module, where the cold method memory page module is configured to: calculate, based on the start address and the end address of the cold method that are obtained by the cold method address calculation module, a size of the memory occupied by the code of the cold method; and determine a cold method memory page based on a size of a single memory page in the operating system, the size of the memory occupied by the code of the cold method, and the start address and the end address of the cold method, where the cold method memory page is a memory page on which code segment memory is fully occupied by the cold method;

and the first memory releasing module is specifically configured to release the cold method memory page obtained by the cold method memory page module.

In a possible implementation of the second aspect, the apparatus further includes: a release advising module, configured to call a first function to advise a kernel of the operating system to release memory occupied by code of the method invoked by the target program; a second hot method address obtaining module, configured to obtain a start address and an end address of a hot method, where the hot method is used to indicate a method corresponding to the method information in the profile file or a method that corresponds to the method information in the profile file and whose method status is the first state; and a second memory releasing module, configured to release, based on a size of memory occupied by code of the hot method and the start address and the end address of the hot method that are obtained by the second hot method address obtaining module, code segment memory occupied by a method invoked by the target program.

In a possible implementation of the second aspect, the second hot method address obtaining module is specifically configured to: obtain a method identifier of the hot method; obtain the start address of the hot method based on the method identifier of the hot method; obtain a header of the hot method based on the start address of the hot method; calculate, based on the header of the hot method, the size of the memory occupied by the code of the hot method; and obtain the end address of the hot method based on the size of the memory occupied by the code of the hot method and the start address of the hot method.

In a possible implementation of the second aspect, the apparatus further includes: a page spanning determining module, configured to determine, based on the size of the memory occupied by the code of the hot method and a size of a single memory page in the operating system, whether page spanning exists in the hot method, where the page spanning is used to indicate that a method occupies code segment memory of at least two memory pages; and an address access module, configured to: when the page spanning determining module determines that page spanning exists in the hot method, access the start address, an intermediate address, and the end address of the hot method, and/or when the page spanning determining module determines that page spanning does not exist in the hot method, access the start address and the end address of the hot method, where the intermediate address is used to indicate an address at a distance of N single memory pages in the operating system from the start address in the same method, and N is a positive integer, where the second memory releasing module is specifically configured to release a memory page that is not accessed by the address access module and that is occupied by a method invoked by the target program.

In a possible implementation of the second aspect, the apparatus further includes a compilation module, configured to perform ahead-of-time compilation technology AOT compilation on the method information of the method whose method status is the first state in the profile file.

According to the apparatus provided in this embodiment of this application, method information of methods that are invoked frequently can be collected, and in addition, methods corresponding to collected method information are classified. The collection of method information of methods is optimized, and more method information of invoked methods is collected without increasing a workload of compiling the method information into machine-recognizable code. In addition, a specific memory page that is occupied by the code of the cold method and needs to be released can be positioned. Therefore, the memory can be accurately released with ensured smooth running of the program, or the memory occupied by the code of the cold method (a method that is invoked relatively infrequently) is accurately released with maintained smooth running of the program.

According to a third aspect, this application provides a computing device, where the computing device includes at least one processor and at least one storage medium, the at least one storage medium stores a programmable instruction, and the at least one processor invokes the programmable instruction to perform the method described in the first aspect or any one of the possible implementations of the first aspect.

According to a fourth aspect, this application provides a computer readable storage medium, where the computer readable storage medium stores a programmable instruction, and when the programmable instruction runs on a computer, the computer performs the method described in the first aspect or any one of the possible implementations of the first aspect.

According to a fifth aspect, this application provides a computer program product, where the operating system includes a first threshold, a second threshold, and a method status, the second threshold is greater than 0 and less than the first threshold, the method status is used to indicate a status of a method, the method status is a first state or a second state, the first state is used to indicate a state in which a corresponding quantity of times of invoking the method is greater than the first threshold, the second state is used to indicate a state in which a corresponding quantity of times of invoking the method is greater than the second threshold and less than or equal to the first threshold, the quantity of times of invoking is a quantity of times of invoking the method by a target program in a running lifecycle of the target program, and the target program is any program running in the operating system.

In a possible implementation of the fifth aspect, the operating system further includes a shared mapping, a status setting function, and a status return function, where the shared mapping is used to record a correspondence between a method identifier and the method status, and the method identifier is used to indicate the method corresponding to the method identifier; the status setting function is used to write a method identifier and a method status of a same method into the shared mapping or set a method status corresponding to a method identifier of a method in the shared mapping; and the status return function is used to return a corresponding method status based on a method identifier of a method and the shared mapping.

In a possible implementation of the fifth aspect, when a quantity of times of invoking a method is greater than the first threshold, the status setting function is used to set a method status of the method to the first state; or when a quantity of times of invoking a method is greater than the second threshold and less than or equal to the first threshold, the status setting function is used to set a method status of the method to the second state.

According to a sixth aspect, this application provides a method for releasing memory, where the method includes: obtaining a start address and an end address of a hot method in a profile file, where the hot method is used to indicate a method corresponding to method information in the profile file corresponding to a target program, optionally, the method corresponding to the method information may also be a method corresponding to method information that satisfies a preset condition, and optionally, the profile file is obtained by using the method described in the first aspect or any one of the possible implementations of the first aspect; obtaining a start address and an end address of a cold method based on the start address and the end address of the hot method, where the cold method is used to indicate a method that is invoked by the target program and whose corresponding method information is not written into the profile file; and releasing, based on the start address and the end address of the cold method, memory occupied by code of the cold method.

In a possible implementation of the sixth aspect, the obtaining a start address and an end address of a hot method in the profile file includes: obtaining a method identifier of the hot method; obtaining the start address of the hot method based on the method identifier of the hot method; obtaining a header of the hot method based on the start address of the hot method; calculating, based on the header of the hot method, a size of memory occupied by code of the hot method; and obtaining the end address of the hot method based on the size of the memory occupied by the code of the hot method and the start address of the hot method.

In a possible implementation of the sixth aspect, after the obtaining a method identifier of the hot method, the method includes: storing the method identifier of the hot method in a first set; the obtaining the start address of the hot method based on the method identifier of the hot method includes: traversing the first set to obtain the start address of the hot method based on the method identifier of the hot method, and storing the start address of the hot method in a second set based on a value of the start address; and after the obtaining the end address of the hot method based on the size of the memory occupied by the code of the hot method and the start address of the hot method, the method includes: storing the end address of the hot method in a third set based on a value of the end address.

In a possible implementation of the sixth aspect, the obtaining a start address and an end address of a cold method based on the start address and the end address of the hot method includes: obtaining the start address and the end address of the cold method based on the second set and the third set.

In a possible implementation of the sixth aspect, the releasing, based on the start address and the end address of the cold method, memory occupied by code of the cold method includes: calculating, based on the start address and the end address of the cold method, a size of the memory occupied by the code of the cold method; determining a cold method memory page based on a size of a single memory page in the operating system, the size of the memory occupied by the code of the cold method, and the start address and the end address of the cold method, where the cold method memory page is a memory page on which code segment memory is fully occupied by the cold method; and releasing the cold method memory page.

According to the method for releasing memory provided in this embodiment of this application, a specific memory page that is occupied by the code of the cold method and needs to be released can be positioned. Therefore, the memory can be accurately released with ensured smooth running of the program.

According to a seventh aspect, this application provides a method for releasing memory, where the method includes: calling a first function to advise a kernel of the operating system to release memory occupied by code of a method invoked by the target program; obtaining a start address and an end address of a hot method, where the hot method is used to indicate a method corresponding to method information in the profile file, optionally, the method corresponding to the method information may also be a method corresponding to method information that satisfies a preset condition, and optionally, the profile file is obtained by using the method described in the first aspect or any one of the possible implementations of the first aspect; and releasing, based on a size of memory occupied by code of the hot method and the start address and the end address of the hot method, code segment memory occupied by a method invoked by the target program.

In a possible implementation of the seventh aspect, the obtaining a start address and an end address of a hot method includes: obtaining a method identifier of the hot method; obtaining the start address of the hot method based on the method identifier of the hot method; obtaining a header of the hot method based on the start address of the hot method; calculating, based on the header of the hot method, the size of the memory occupied by the code of the hot method; and obtaining the end address of the hot method based on the size of the memory occupied by the code of the hot method and the start address of the hot method.

In a possible implementation of the seventh aspect, the releasing, based on a size of memory occupied by code of the hot method and the start address and the end address of the hot method, code segment memory occupied by a method invoked by the target program includes: determining, based on the size of the memory occupied by the code of the hot method and a size of a single memory page in the operating system, whether page spanning exists in the hot method, where the page spanning is used to indicate that a method occupies code segment memory of at least two memory pages; and if page spanning exists in the hot method, accessing the start address, an intermediate address, and the end address of the hot method, and releasing a memory page that is not accessed and that is occupied by a method invoked by the target program, where the intermediate address is used to indicate an address at a distance of N single memory pages in the operating system from the start address in the same method, and N is a positive integer; or if page spanning does not exist in the hot method, accessing the start address and the end address of the hot method, and releasing a memory page that is not accessed and that is occupied by a method invoked by the target program.

According to the method for releasing memory provided in this embodiment of this application, memory occupied by code of a cold method (a method that is invoked relatively infrequently) can be accurately released with maintained smooth running of the program.

According to an eighth aspect, this application provides a computing device, where the computing device includes at least one processor and at least one storage medium, the at least one storage medium stores a programmable instruction, and the at least one processor invokes the programmable instruction to perform the method described in the sixth aspect or any one of the possible implementations of the sixth aspect, and/or the method described in the seventh aspect or any one of the possible implementations of the seventh aspect.

According to a ninth aspect, this application provides a computer readable storage medium, where the computer readable storage medium stores a programmable instruction, and when the programmable instruction runs on a computer, the computer performs the method described in the sixth aspect or any one of the possible implementations of the sixth aspect, and/or the method described in the seventh aspect or any one of the possible implementations of the seventh aspect.

DESCRIPTION OF EMBODIMENTS

To make the objective, technical solutions, and advantages of this application clearer, the following further describes the technical solutions of this application in detail with reference to the accompanying drawings.

A method for collecting information according to an embodiment of this application may be applied to various terminals. The terminal device includes but is not limited to a personal computer, a server computer, a handheld or laptop device, a mobile device (for example, a mobile phone, a mobile phone, a tablet computer, a PDA, or a media player), a consumer electronic device, an in-vehicle computer, a smartwatch, a television, another terminal device having a display screen, or the like.

The following describes specific implementation processes of the embodiments of the present invention in detail by using a mobile phone as an example. The following first briefly describes a specific structure of a mobile phone, as shown in FIG. 1.

Figure 1:
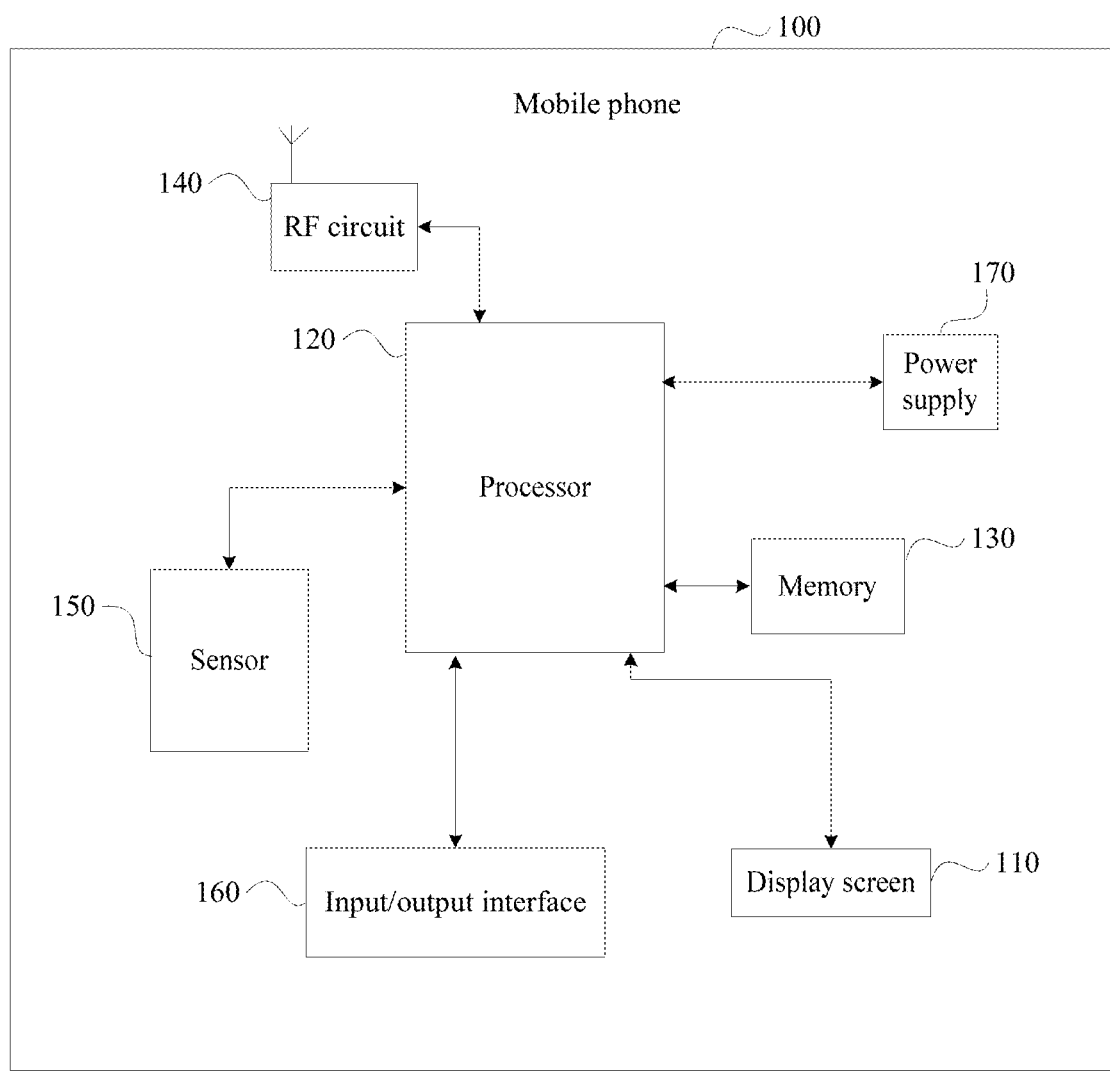
FIG. 1 is a schematic diagram of a mobile phone according to an embodiment of this application.

FIG. 1 is a schematic diagram of a hardware structure of a mobile phone applied to an embodiment of this application. As shown in FIG. 1, the mobile phone 100 includes a display screen 110, a processor 120, and a memory 130. The memory 130 may be configured to store a computer program and data. The processor 120 executes various function applications and data processing of the mobile phone 100 by running the computer program and data stored in the memory 130. The memory 130 may mainly include a program storage area and a data storage area. The program storage area may store an operating system, an application program required by at least one function (such as an image playing function), or the like. The data storage area may store data (such as audio data, a phone book, or image data) that is created based on use of the mobile phone 100, or the like. In addition, the memory 130 may include a high-speed random access memory, and may further include a non-volatile memory, for example, at least one magnetic disk storage device, a flash memory device, or another volatile solid-state memory device. The processor 120 is a control center of the mobile phone 100, uses various interfaces and lines to connect all parts of the entire mobile phone, and executes various functions and data processing of the mobile phone 100 by running or executing the software program and/or data stored in the memory 130, to perform overall monitoring on the mobile phone. The processor 120 may include one or more general purpose processors, or may further include one or more digital signal processors (digital signal processor, DSP), or may include one or more image signal processors (image signal processor, ISP), configured to perform related operations to implement the technical solution provided in this embodiment of this application.

The display screen 110 is configured to display information entered by a user or information provided for a user and various menu interfaces of the mobile phone 100. Optionally, for the display screen 110, the display screen 110 may be configured in a form such as a liquid crystal display (liquid crystal display, LCD) or an OLED (organic light-emitting diode, organic light-emitting diode).

The mobile phone 100 may further include a radio frequency (radio frequency, RF) circuit 140. The RF circuit 140 may be configured to receive and transmit information or receive and transmit signals in a call process. Usually, the RF circuit 140 includes but is not limited to an antenna, at least one amplifier, a transceiver, a coupler, a low noise amplifier (low noise amplifier, LNA), a duplexer, or the like.

The mobile phone 100 may further include one or more sensors 150, for example, an image sensor, an optical sensor, or a motion sensor.

The mobile phone 100 may further include an input/output interface 160, configured to: receive entered digital information, character information, or a contact touch operation or a non-contact gesture, and generate signal input related to a user setting and function control of the mobile phone 100, or the like. Specifically, the input/output interface 160 may include but is not limited to one or more of a physical keyboard, a function key (such as a volume control key or an on/off key), a touchscreen, or the like.

In addition, the mobile phone 100 further includes a power supply 170 (such as a battery) supplying power to each component. The power supply may be logically connected to the processor 120 by using a power management system, to implement functions such as charging and discharging management and power consumption management by using the power management system.

Certainly, depending on a requirement in a specific application, the mobile phone 100 may further include a camera, an audio circuit, a loudspeaker, or the like. Because the parts are not parts that are frequently used in this embodiment of this application, the parts are not shown in FIG. 1, and are not described in detail.

Figure 2:
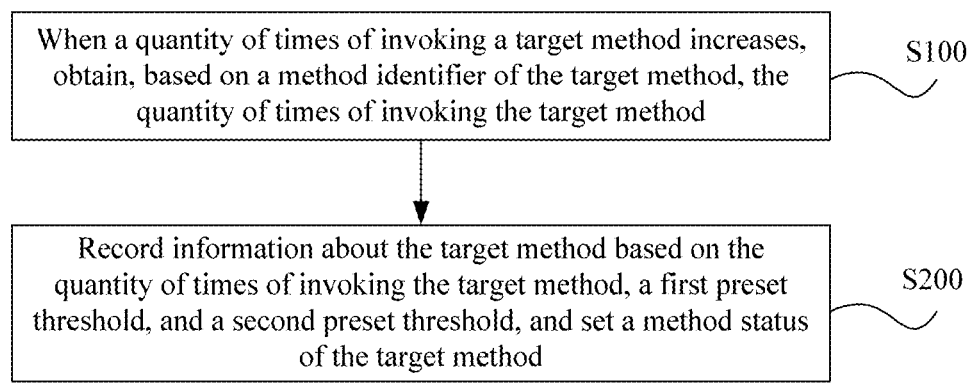
FIG. 2 is a flowchart of a method for collecting information according to an embodiment of this application.

In this embodiment of this application, the mobile phone 100 shown in FIG. 1 is used as an example for description. However, this embodiment of this application may be applied to other types of devices, and this is not limited. As shown in FIG. 2, an embodiment of this application describes a method for collecting information. The method is applied to a mobile phone 100, an operating system runs on the mobile phone 100, and the operating system is not limited to an ANDROID operating system or an IOS. The method includes the following steps.

S100. When a quantity of times of invoking a target method is updated, the mobile phone 100 obtains, based on a method identifier of the target method, the quantity of times of invoking the target method, where the target method is any one of at least one method invoked by a target program, the target program is any program running in the operating system of the mobile phone 100, the quantity of times of invoking is a quantity of times of invoking the method by the target program in a running lifecycle of the target program, and the method identifier is used to indicate the method invoked by the target program and corresponding to the method identifier.

In this embodiment of this application, the mobile phone 100 may obtain, by using a processor 120, the quantity of times of invoking the target method, and may further obtain, from a memory 130 of the mobile phone 100 by using the processor 120, the quantity of times of invoking the target method. The memory 130 stores running data corresponding to the target program, and the quantity of times of invoking the target method is stored in the running data.

S200. The mobile phone 100 records method information of the target method based on the quantity of times of invoking the target method, a first threshold, and a second threshold, and sets a method status of the target method, where the method status is used to indicate a status of the method invoked by the target program and corresponding to the method status, the method status is classified into a first state and a second state, the first state corresponds to the first threshold, the second state corresponds to the second threshold, and the second threshold is greater than 0 and less than the first threshold. Specifically, a status setting function is called to write the method identifier of the target method and the corresponding method status into a shared mapping, where the shared mapping is used to record a correspondence between the method identifier and the method status. Optionally, the first threshold and the second threshold may be adjustable thresholds. The first threshold and the second threshold may be adjusted based on an objective to be achieved.

In this embodiment of this application, after obtaining the quantity of times of invoking the target method, the mobile phone 100 may obtain the first threshold and the second threshold from the memory 130 by using the processor 120, and record the method information of the target method based on the quantity of times of invoking the target method, the first threshold, and the second threshold. Specifically, the processor 120 records the method information of the target method based on the quantity of times of invoking the target method, the first threshold, and the second threshold, and sets the method status of the target method. More specifically, the processor 120 calls the status setting function from the memory 130 to write the method identifier of the target method and the corresponding method status into the shared mapping, to achieve an objective of setting the method status of the target method.

Figure 3:
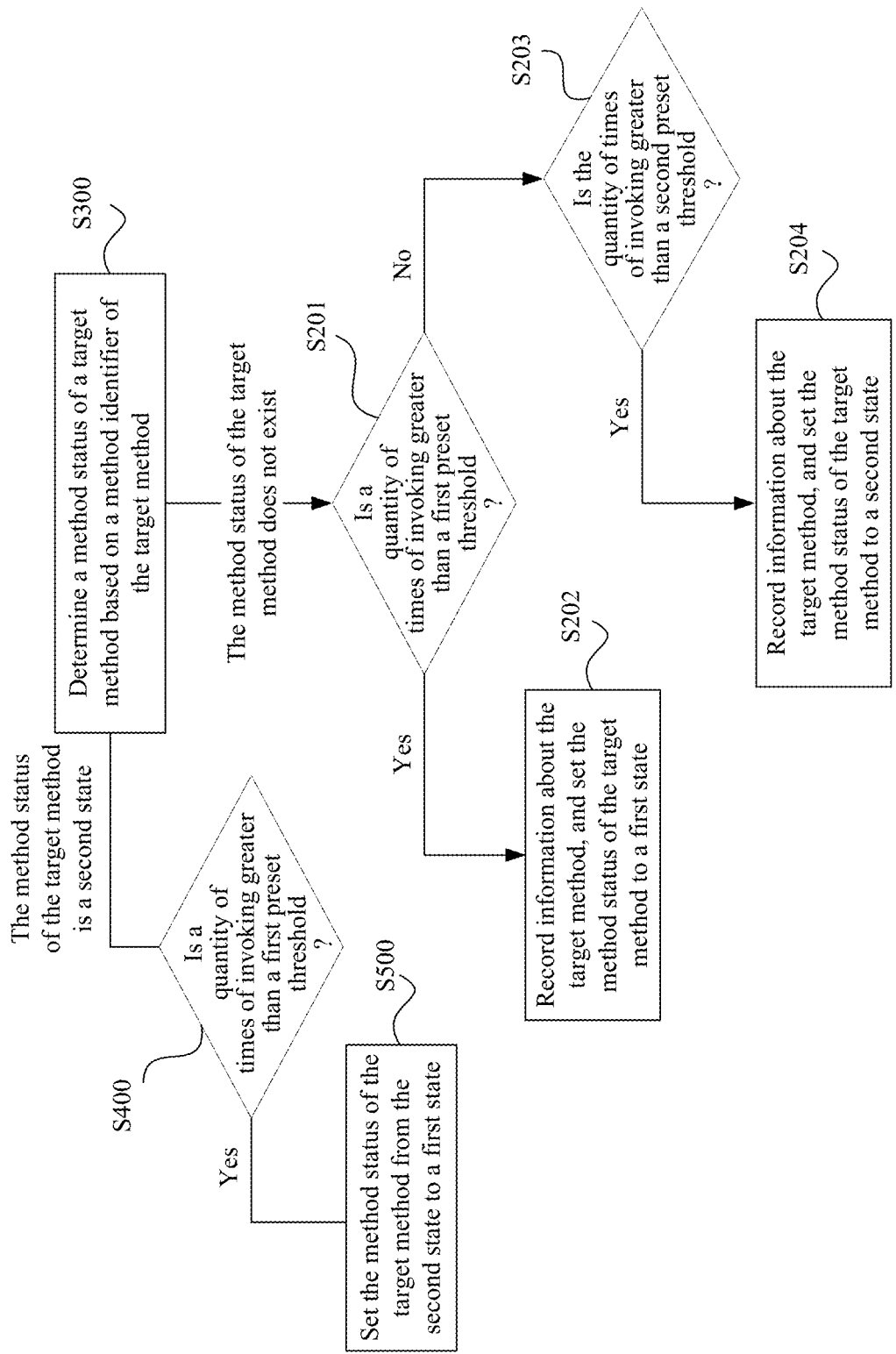
FIG. 3 is a flowchart of a method for collecting information according to an embodiment of this application.

As shown in FIG. 3, S200 specifically includes the following steps:

S201. The mobile phone 100 determines whether the quantity of times of invoking the target method is greater than the first threshold.

S202. If the quantity of times of invoking the target method is greater than the first threshold, the mobile phone 100 records the method information of the target method and sets the method status of the target method to the first state.

S203. Otherwise, the mobile phone 100 determines whether the quantity of times of invoking the target method is greater than the second threshold.

S204. If the quantity of times of invoking the target method is greater than the second threshold, the mobile phone 100 records the method information of the target method and sets the method status of the target method to the second state.

In this embodiment of this application, before S200, the method further includes S300: The mobile phone 100 determines the method status of the target method based on the method identifier of the target method. Actually, a result of determining the method status of the target method may include three cases: The corresponding method status of the target method does not exist, the corresponding method status of the target method is the first state, and the corresponding method status of the target method is the second state.

In this embodiment of this application, specifically, the mobile phone 100 may determine, by using the processor 120, the method status of the target method based on the method identifier of the target method, or may obtain the method identifier of the target method from the memory 130 by using the processor 120, and determine the method status of the target method based on the method identifier of the target method.

In this embodiment of this application, if the result of determining, by the mobile phone 100, the method status of the target method based on the method identifier of the target method is that the method status of the target method does not exist, the mobile phone 100 performs S200, to be specific, S201 to S204.

If the result of determining, by the mobile phone 100, the method status of the target method based on the method identifier of the target method is that the method status of the target method is the second state, the mobile phone 100 performs the following steps:

S400. The mobile phone 100 determines whether the quantity of times of invoking the target method is greater than the first threshold.

S500. If the quantity of times of invoking the target method is greater than the first threshold, the mobile phone 100 sets the method status of the target method from the second state to the first state. Specifically, the mobile phone 100 calls the status setting function to set the method status of the target method from the second state to the first state.

If the result of determining, by the mobile phone 100, the method status of the target method based on the method identifier of the target method is that the method status of the target method is the first state, it indicates that the method information of the target method has been recorded and the method status of the target method does not need to be updated any longer. In other words, the mobile phone 100 does not need to perform a further specific step.

In this embodiment of this application, specifically, the mobile phone 100 may perform the foregoing step in cooperation with the processor 120 and the memory 130.

Figure 4:
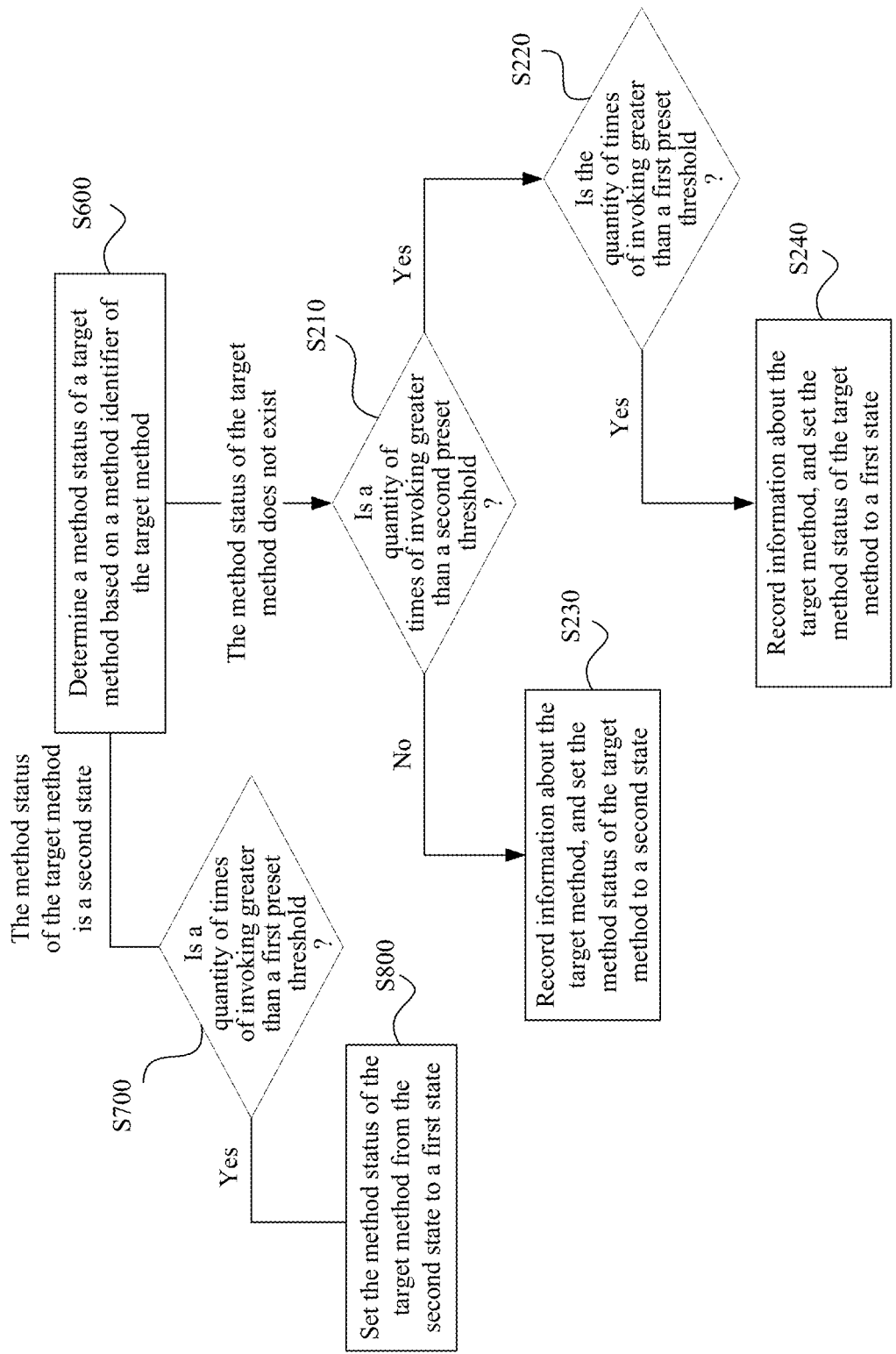
FIG. 4 is a flowchart of a method for collecting information according to an embodiment of this application.

Optionally, as shown in FIG. 4, S200 specifically includes the following steps:

S210. The mobile phone 100 determines whether the quantity of times of invoking the target method is greater than the second threshold.

S220. If the quantity of times of invoking the target method is greater than the second threshold, the mobile phone 100 determines whether the quantity of times of invoking the target method is greater than the first threshold.

S230. If the quantity of times of invoking the target method is greater than the first threshold, the mobile phone 100 records the method information of the target method and sets the method status of the target method to the first state.

S240. Otherwise, the mobile phone 100 records the method information of the target method and sets the method status of the target method to the second state.

In this embodiment of this application, before S200, the method further includes S600: The mobile phone 100 determines the method status of the target method based on the method identifier of the target method. A result of determining the method status of the target method may include three cases. The cases are not described herein again. For details, refer to corresponding descriptions of the embodiment corresponding to FIG. 3.

In this embodiment of this application, specifically, the mobile phone 100 may determine, by using the processor 120, the method status of the target method based on the method identifier of the target method, or may obtain the method identifier of the target method from the memory 130 by using the processor 120, and determine the method status of the target method based on the method identifier of the target method.

In this embodiment of this application, if the result of determining, by the mobile phone 100, the method status of the target method based on the method identifier of the target method is that the method status of the target method does not exist, the mobile phone 100 performs S200, to be specific, S210 to S240. If the result of determining, by the mobile phone 100, the method status of the target method based on the method identifier of the target method is that the method status of the target method is the second state, the mobile phone 100 performs the following steps:

S700. The mobile phone 100 determines whether the quantity of times of invoking the target method is greater than the first threshold.

S800. If the quantity of times of invoking the target method is greater than the first threshold, the mobile phone 100 sets the method status of the target method from the second state to the first state. Specifically, the mobile phone 100 calls the status setting function to set the method status of the target method from the second state to the first state.

If the result of determining, by the mobile phone 100, the method status of the target method based on the method identifier of the target method is that the method status of the target method is the first state, it indicates that the method information of the target method has been recorded and the method status of the target method does not need to be updated any longer. In other words, the mobile phone 100 does not need to perform a further specific step.

In this embodiment of this application, specifically, the mobile phone 100 may perform the foregoing step in cooperation with the processor 120 and the memory 130.

It should be noted that, content of steps S300 to S500 in the embodiment corresponding to FIG. 3 may be the same as content of steps S600 to S800 in the embodiment corresponding to FIG. 4, and steps S201 to S204 in the embodiment corresponding to FIG. 3 and steps S210 to S240 in the embodiment corresponding to FIG. 4 are steps of two possible implementation method steps of step S200.

Figure 5:
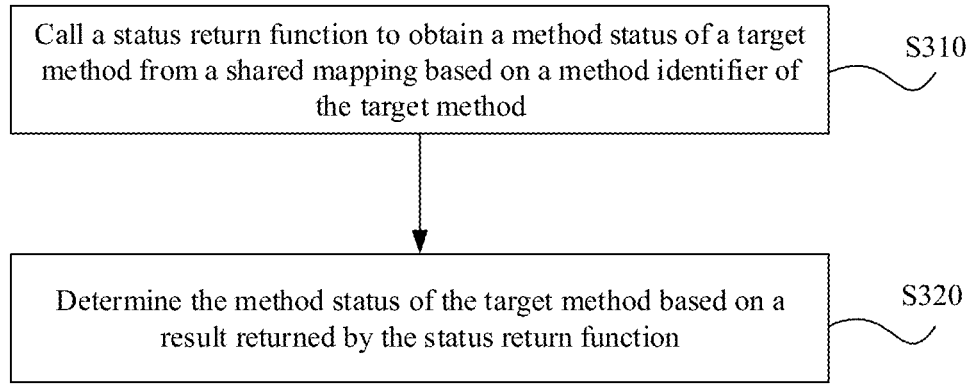
FIG. 5 is a flowchart of a method for determining a method status according to an embodiment of this application.

In this embodiment of this application, as shown in FIG. 5, S300 or S600 specifically includes the following steps.

S310. The mobile phone 100 calls a status return function to obtain the method status of the target method from the shared mapping based on the method identifier of the target method.

In this embodiment of this application, the mobile phone 100 may call the status return function by using the processor 120, to obtain the method status of the target method from the shared mapping based on the method identifier of the target method, or may call the status return function from the memory 130 by using the processor 120, and obtain, based on the method identifier of the target method, the method status of the target method from the shared mapping stored in the memory 130.

S320. The mobile phone 100 determines the method status of the target method based on a result returned by the status return function. The result returned by the status return function includes three cases. The cases are not described herein again. For details, refer to corresponding descriptions of the embodiment corresponding to FIG. 3. In actual implementation, the cases may be defined as follows: If the result returned by the status return function is null, it indicates that the method status does not exist; if the returned result is 0, it indicates that the method status is the first state; or if the returned result is 1, it indicates that the method status is the second state.

In this embodiment of this application, the mobile phone 100 may determine, by using the processor 120, the method status of the target method based on the result returned by the status return function.

Figure 6:
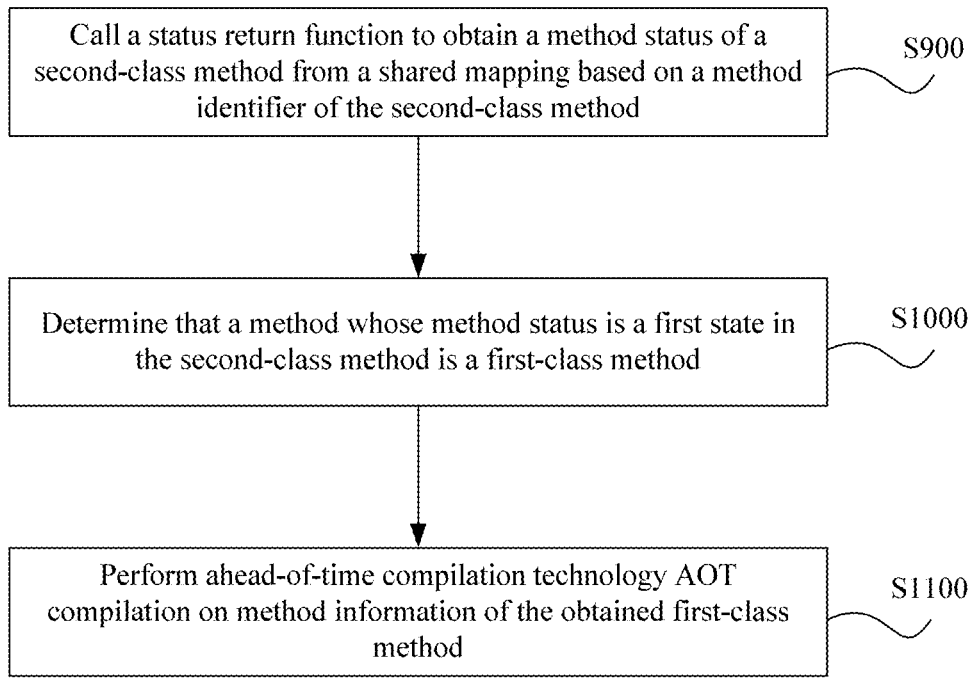
FIG. 6 is a flowchart of a method for performing AOT compilation according to an embodiment of this application.

Optionally, the recording the method information of the target method in the foregoing embodiment is specifically: writing the method information of the target method into a profile file corresponding to the target program, where the profile file is a file used to store the running data of the target program, and the profile file corresponding to the target program includes information about at least one method invoked by the target program. In this embodiment of this application, based on the profile file corresponding to the target program, as shown in FIG. 6, the method further includes the following steps.

S900. The mobile phone 100 calls the status return function to obtain a method status of a second-class method from a shared mapping based on a method identifier of the second-class method, where the second-class method is used to indicate a method corresponding to the method information in the profile file corresponding to the target program.

In this embodiment of this application, the mobile phone 100 may call the status return function by using the processor 120, to obtain the method status of the second-class method from the shared mapping based on the method identifier of the second-class method, or may call the status return function from the memory 130 by using the processor 120, and obtain, based on the method identifier of the second-class method, the method status of the second-class method from the shared mapping stored in the memory 130.

S1000. The mobile phone 100 determines that a method whose corresponding method status is the first state in the second-class method is a first-class method.

In this embodiment of this application, the mobile phone 100 may determine, by using the processor 120, that the method whose corresponding method status is the first state in the second-class method is the first-class method.

S1100. The mobile phone 100 performs ahead-of-time compilation technology AOT compilation on method information of the obtained first-class method.

In this embodiment of this application, the mobile phone 100 may perform ahead-of-time compilation technology AOT compilation on the method information of the obtained first-class method by using the processor 120.

According to the method for collecting information provided in this embodiment of this application, method information of methods that are invoked frequently can be collected, and in addition, methods corresponding to collected method information are classified. The collection of method information of methods is optimized, and more method information of invoked methods is collected without increasing a workload of compiling the method information into machine-recognizable code.

It can be learned from the background that, as a program runs, code of a method invoked by the program is continuously loaded into a memory (RAM, Random Access Memory). To ensure smooth running of the running program, for the method information collected based on the profile file, the embodiments of this application provide two methods for releasing memory, and the methods may be applied to various terminals. In the embodiments of this application, the mobile phone 100 shown in FIG. 1 is used as an example for description. However, the embodiments of this application may be applied to other types of devices, and this is not limited. Specifically, the memory 130 of the mobile phone 100 includes two types of specific storage media: RAM and ROM (Read Only Memory). The method for releasing memory according to the embodiments of this application is used to release memory of the mobile phone 100, to be specific, to release the RAM of the mobile phone 100.

Figure 7:
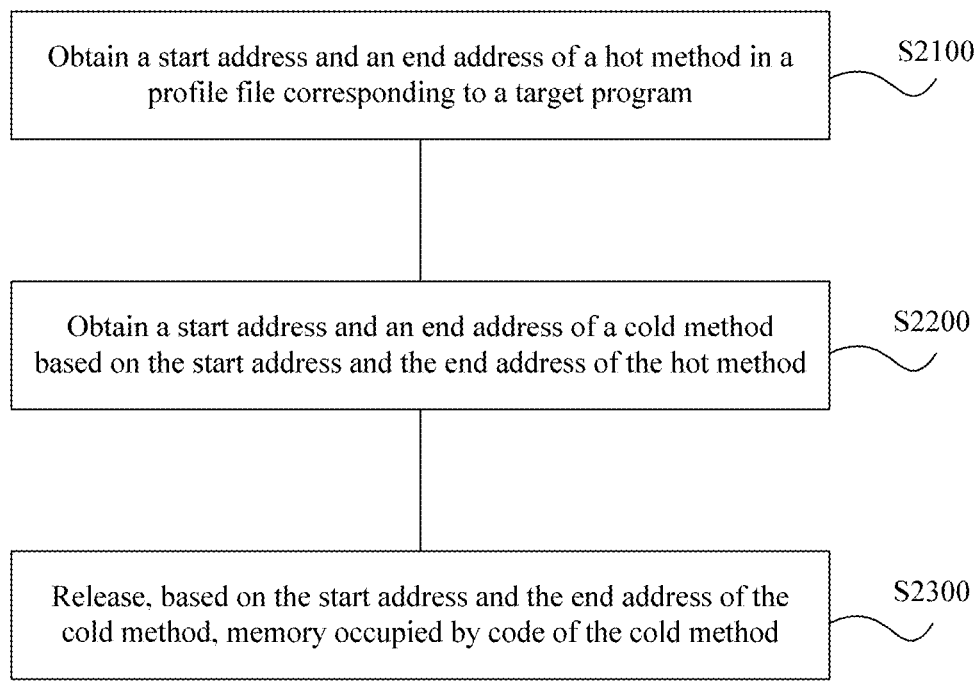
FIG. 7 is a flowchart of a method for releasing memory according to an embodiment of this application.

As shown in FIG. 7, an embodiment of this application provides a method for releasing memory, and the method includes the following steps.

S2100. A mobile phone 100 obtains a start address and an end address of a hot method in a profile file corresponding to a target program, where the hot method is used to indicate a method corresponding to method information in the profile file corresponding to the target program, the method information in the profile file may be obtained by using the method for collecting information according to the foregoing embodiment, or may be obtained by using an existing method in the prior art or a method that may emerge subsequently, and a specific implementation of collecting the method information in the profile file is not limited in this embodiment of this application. It should be noted that, if the method information in the profile file is obtained by using the method for collecting information according to the foregoing embodiment, the hot method may be a method corresponding to the method information in the profile file, or may be a method that corresponds to the method information in the profile file and whose method status is the first state. In this application, for example, the hot method is a method corresponding to the method information in the profile file. Correspondingly, if the hot method is a method corresponding to the method information in the profile file, the cold method is used to indicate a method that is invoked by the target program and whose corresponding method information is not written into the profile file; or if the hot method is a method that corresponds to the method information in the profile file and whose method status is the first state, the cold method is used to indicate a method that is invoked by the target program and whose corresponding method information is not written into the profile file and a method that corresponds to the method information in the profile file and whose method status is the second state.

Figure 8:
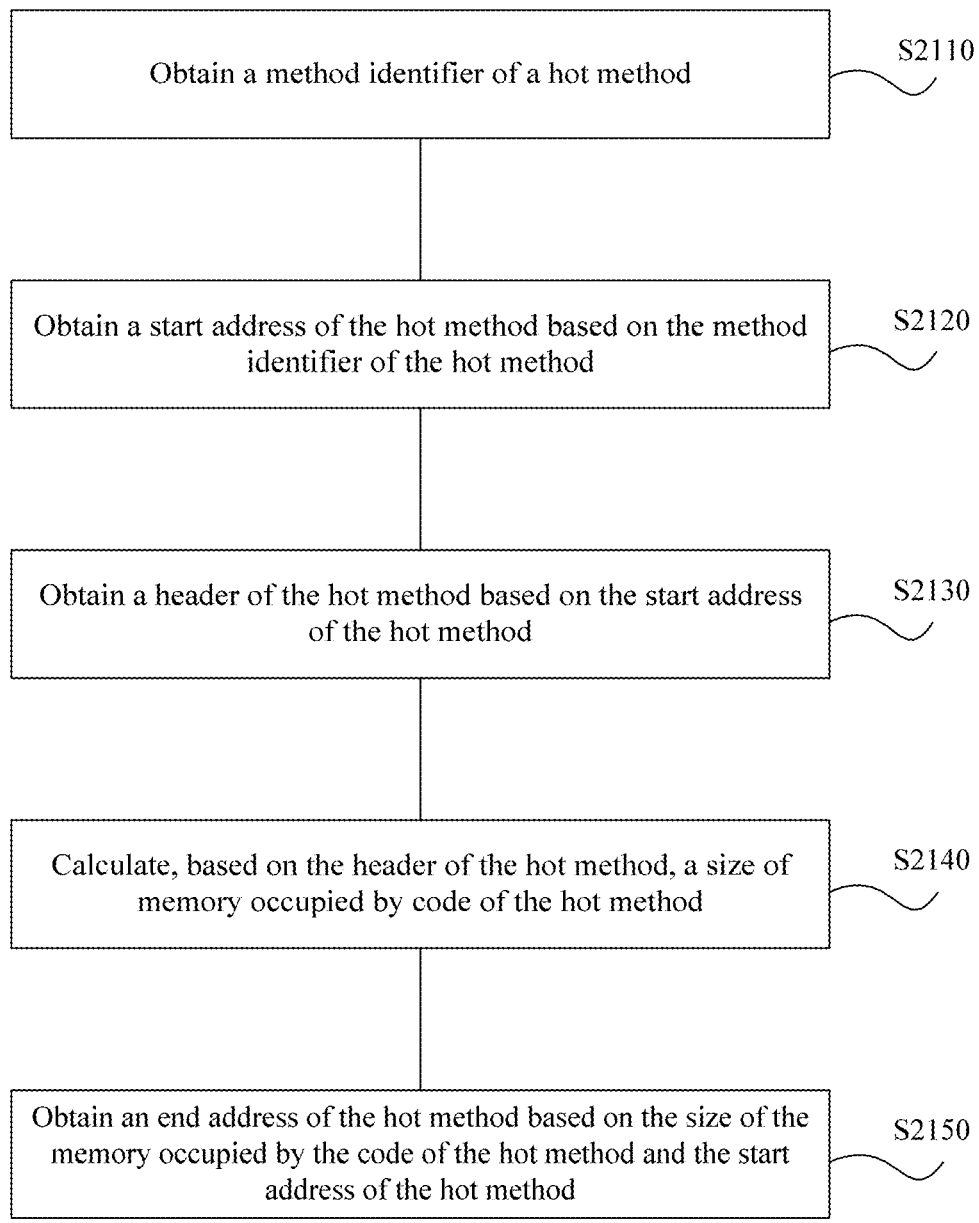
FIG. 8 is a flowchart of a method for obtaining an address of a hot method according to an embodiment of this application.

Further, as shown in FIG. 8, S2100 specifically includes the following steps.

S2110. The mobile phone 100 obtains a method identifier of the hot method.

S2120. The mobile phone 100 obtains the start address of the hot method based on the method identifier of the hot method.

S2130. The mobile phone 100 obtains a header of the hot method based on the start address of the hot method.

S2140. The mobile phone 100 calculates, based on the header of the hot method, a size of memory occupied by code of the hot method.

S2150. The mobile phone 100 obtains the end address of the hot method based on the size of the memory occupied by the code of the hot method and the start address of the hot method.

In this embodiment of this application, the mobile phone 100 may perform, by using a processor 120, S2110 to S2150 to obtain the start address and the end address of the hot method in the profile file corresponding to the target program.

S2200. The mobile phone 100 obtains a start address and an end address of a cold method based on the start address and the end address of the hot method, where the cold method is used to indicate a method that is invoked by the target program and whose corresponding method information is not written into the profile file.

In this embodiment of this application, the mobile phone 100 may obtain, by using the processor 120, the start address and the end address of the cold method based on the start address and the end address of the hot method.

S2300. The mobile phone 100 releases, based on the start address and the end address of the cold method, memory occupied by code of the cold method.

In this embodiment of this application, the mobile phone 100 may release, based on the start address and the end address of the cold method by using the processor 120, the memory occupied by the code of the cold method.

Further, in this embodiment of this application, after S2110, the mobile phone 100 stores the method identifier of the hot method in a first set.

In addition, S2120 is specifically: the mobile phone 100 traverses the first set to obtain the start address of the hot method based on the method identifier of the hot method, and stores the start address of the hot method in a second set based on a value of the start address.

After S2150, the mobile phone 100 stores the end address of the hot method in a third set based on a value of the end address.

S2200 specifically includes: obtaining the start address and the end address of the cold method based on the second set and the third set.

Figure 9:
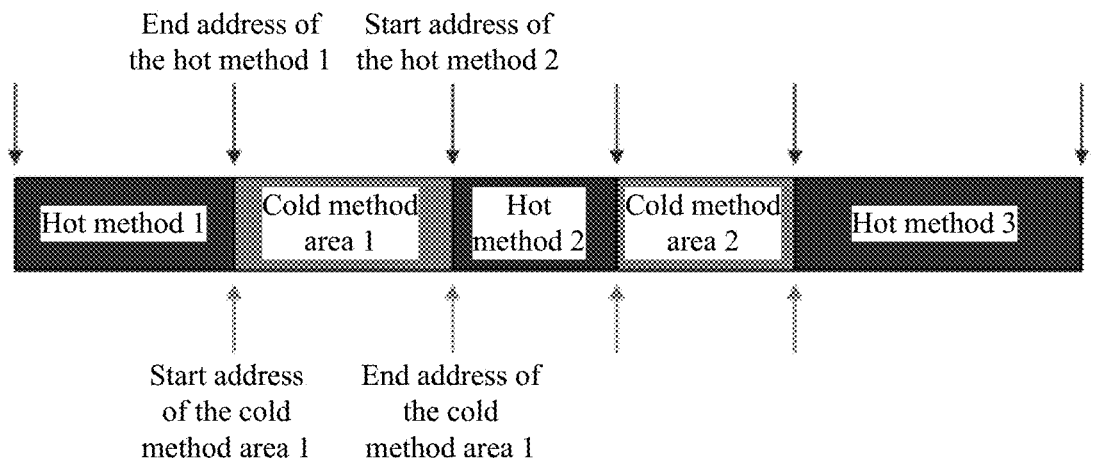
FIG. 9 is a schematic diagram of a start address and an end address of a cold method according to an embodiment of this application.

Because a code segment stored in a memory includes only hot methods and cold methods, a memory area between hot methods is memory occupied by a cold method, as shown in a schematic diagram of the start address and the end address of the cold method in FIG. 9. In this embodiment of this application, the second set stores start addresses of the hot methods, and the third set stores end addresses of the hot methods. Specifically, the mobile phone 100 obtains an end address of a hot method 1 from the third set by using the processor 120, and obtains a start address of a hot method 2 from the second set. A cold method area 1 may be obtained based on the end address of the hot method 1 and the start address of the hot method 2. The cold method area 1 may include one or more cold methods. A plurality of cold method areas may be obtained in this way, to be specific, memory occupied by code of the cold methods.

Actually, the memory uses a page as a unit. Further, S2300 specifically includes: The mobile phone 100 calculates, based on the start address and the end address of the cold method, a size of the memory occupied by the code of the cold method; the mobile phone 100 determines a cold method memory page based on a size of a single memory page, the size of the memory occupied by the code of the cold method, and the start address and the end address of the cold method, where the cold method memory page is a memory page on which code segment memory is fully occupied by the code of the cold method; and the mobile phone 100 releases the cold method memory page.

According to the method for releasing memory provided in this embodiment of this application, a specific memory page that is occupied by the code of the cold method and needs to be released can be positioned. Therefore, the memory can be accurately released with ensured smooth running of the program.

Figure 10:
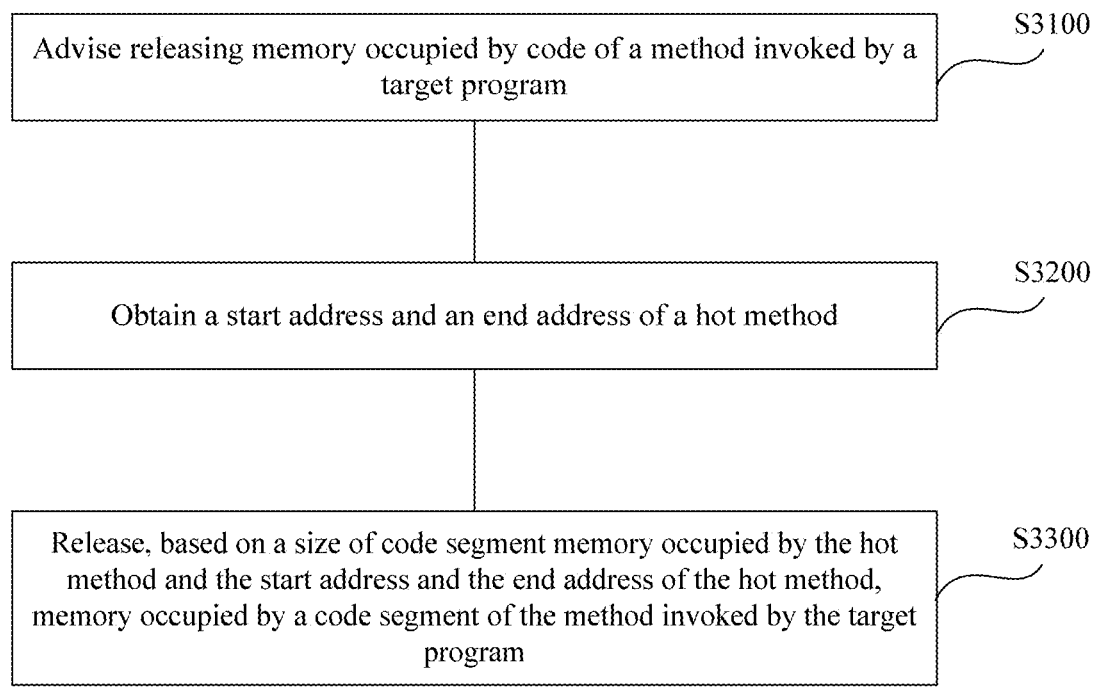
FIG. 10 is a flowchart of a method for releasing memory according to an embodiment of this application.

As shown in FIG. 10, an embodiment of this application provides a method for releasing memory, and the method includes the following steps.

S3200. A mobile phone 100 obtains a start address and an end address of a hot method, where the hot method is used to indicate a method corresponding to method information in the profile file or a method that corresponds to method information in the profile file and whose method status is the first state.

In this embodiment of this application, the mobile phone 100 may obtain the start address and the end address of the hot method by using a processor 120.

S3300. The mobile phone 100 releases, based on a size of memory occupied by code of the hot method and the start address and the end address of the hot method, memory occupied by a code segment of a method invoked by the target program.

In this embodiment of this application, the mobile phone 100 may release, based on the size of the memory occupied by the code of the hot method and the start address and the end address of the hot method by using the processor 120, the memory occupied by the code segment of the method invoked by the target program.

Optionally, before S3200, the method further includes S3100: The mobile phone 100 advises releasing memory occupied by code of the method invoked by the target program. Specifically, the mobile phone 100 calls a first function to advise releasing, in memory of an operating system, the memory occupied by the code of the method invoked by the target program. For example, in an installed ANDROID operating system, releasing memory is advised, and the memory is not released directly. A method may be marked through access, and memory occupied by code of the marked method is not be released.

Figure 11:
FIG. 11 is a flowchart of a method for obtaining an address of a hot method according to an embodiment of this application.

Further, as shown in FIG. 11, S3200 specifically includes the following steps:

S3210. The mobile phone 100 obtains a method identifier of the hot method.

S3220. The mobile phone 100 obtains the start address of the hot method based on the method identifier of the hot method.

S3230. The mobile phone 100 obtains a header of the hot method based on the start address of the hot method.

S3240. The mobile phone 100 calculates, based on the header of the hot method, the size of the memory occupied by the code of the hot method.

S3250. The mobile phone 100 obtains the end address of the hot method based on the size of the memory occupied by the code of the hot method and the start address of the hot method.

In this embodiment of this application, the mobile phone 100 may perform, by using the processor 120, S3210 to S3250 to obtain the start address and the end address of the hot method in the profile file corresponding to the target program.

Figure 12:
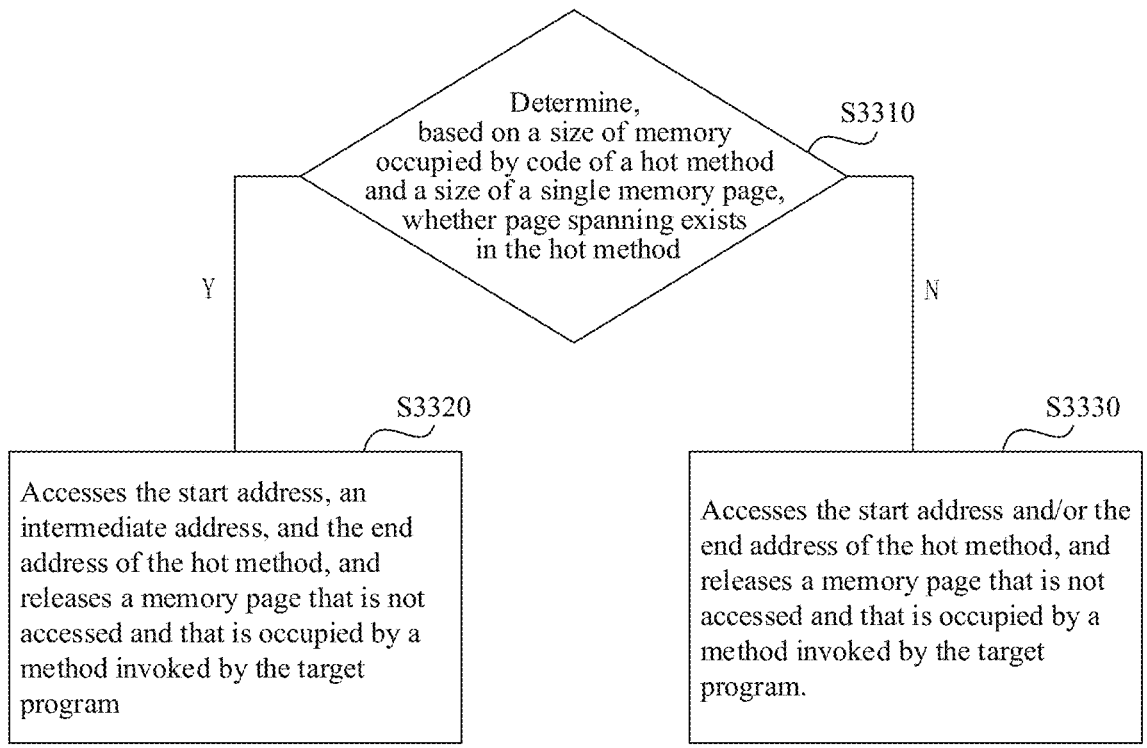
FIG. 12 is a flowchart of a method for determining whether page spanning exists according to an embodiment of this application.

Further, as shown in FIG. 12, S3300 specifically includes the following steps.

S3310. The mobile phone 100 determines, based on the size of the memory occupied by the code of the hot method and a size of a single memory page, whether page spanning exists in the hot method, where the page spanning is used to indicate that code of a method or a method area of a same class occupies code segment memory of at least two consecutive memory pages.

S3320. If page spanning exists in the hot method, the mobile phone 100 accesses the start address, an intermediate address, and the end address of the hot method, and releases a memory page that is not accessed and that is occupied by a method invoked by the target program, where the intermediate address is used to indicate an address at a distance of N single memory pages from the start address in the same method, and N is a positive integer.

Figure 13:
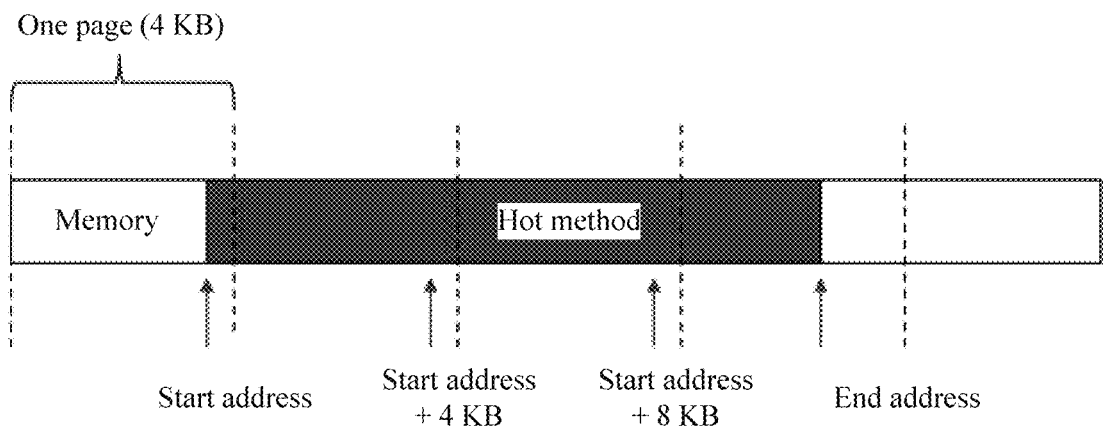
FIG. 13 is a schematic diagram of page spanning of a hot method according to an embodiment of this application.

As shown in FIG. 13, a size of a single memory page is 4 KB. In the figure, code of a hot method occupies four pages; in this case, intermediate addresses are: start address+4 KB, and start address+8 KB.

S3330. If page spanning does not exist in the hot method, the mobile phone 100 accesses the start address and/or the end address of the hot method, and releases a memory page that is not accessed and that is occupied by a method invoked by the target program.

In this embodiment of this application, the mobile phone 100 may advise, by using the processor 120, releasing the memory occupied by the code of the method invoked by the target program. Specifically, the mobile phone 100 may call, by using the processor 120, the first function from the memory 130 to advise releasing, in the memory of the operating system, the memory occupied by the code of the method invoked by the target program.

In actual implementation, for example, in an installed ANDROID operating system, S3300 may be implemented by using the following method: first, calculating a size of memory occupied by the method on a memory page in which the start address is located (first_size=page_size−method_size % page_size), then calculating a quantity of memory pages spanned by the method (number=(method_size−first_size)/page_size+1); and if the quantity of spanned memory pages is equal to 1, accessing the start address and the end address of the method; or if the quantity of spanned memory pages is greater than 1, accessing the start address, the end address, and the intermediate address, where an intermediate address on a page with a current sequence number (cur_num) is (method_start+page_size×cur_num).

In this embodiment of this application, if the profile file is obtained by using the method for collecting information according to the foregoing embodiment, the method further includes: The mobile phone 100 performs ahead-of-time compilation technology AOT compilation on the method information of the method whose method status is the first state in the profile file.

According to the method for releasing memory provided in this embodiment of this application, memory occupied by code of a cold method (a method that is invoked relatively infrequently) can be accurately released with maintained smooth running of the program.

It should be noted that, optionally, the method for releasing memory or the step of releasing memory in the foregoing embodiment is triggered when a condition is satisfied. For example, when memory usage reaches a threshold, the step and method for releasing memory in the foregoing embodiment are triggered; or the step or method for releasing memory in the foregoing embodiment may be triggered at a preset time interval. This is not specifically limited in this application.

Figure 14:
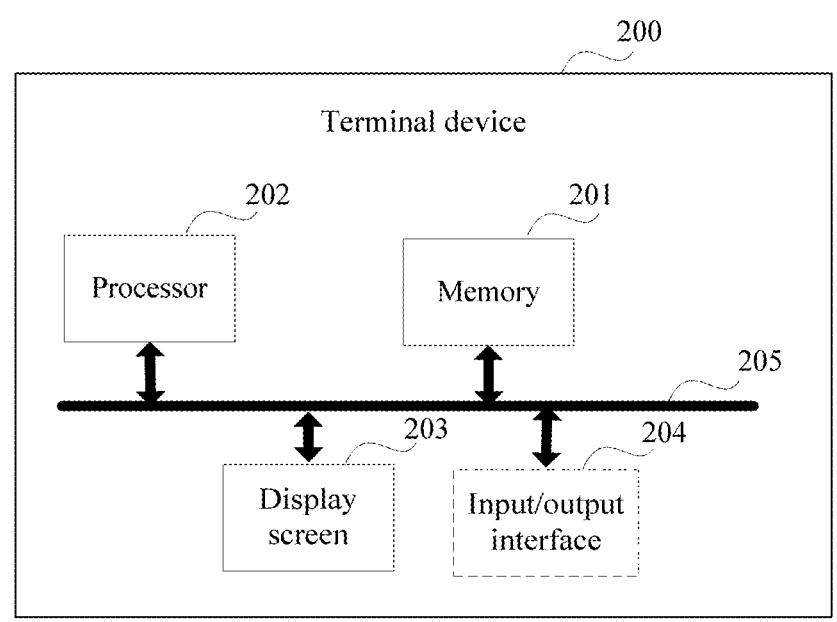
FIG. 14 is a schematic diagram of a terminal device according to an embodiment of this application.

Based on the foregoing embodiment, an embodiment of this application further provides a terminal device 200. The terminal device 200 is configured to implement the method for collecting information according to the embodiment corresponding to FIG. 2 to FIG. 6 and/or the method for releasing memory according to the embodiment corresponding to FIG. 7 to FIG. 9 and/or the method for releasing memory according to the embodiment corresponding to FIG. 10 to FIG. 13. Referring to FIG. 14, the terminal device 200 may include a memory 201, a processor 202, a display screen 203, and an input/output interface 204.

The memory 201 is configured to store a computer program executed by the processor 202. The memory 201 may mainly include a program storage area and a data storage area. The program storage area may store an operating system, an application program required by at least one function, or the like. The data storage area may store data that is created based on use of the terminal device 200, or the like. The processor 202 may be a central processing unit (central processing unit, CPU), a digital processing unit, or the like. The display screen 203 is configured to display information entered by a user or information provided for a user. Optionally, for the display screen 203, the display screen 203 may be configured in a form such as a liquid crystal display (liquid crystal display, LCD) or an OLED (organic light-emitting diode, organic light-emitting diode).

A specific connection medium between the memory 201, the processor 202, the display screen 203, and the input/output interface 204 is not limited in this embodiment of this application. In this embodiment of this application, the memory 201, the processor 202, the display screen 203, and the input/output interface 204 are connected by using a bus 205 in FIG. 14. In FIG. 14, the bus 205 is represented by a thick line, and connection modes of other components are merely used as an example for description, and are not limited. The bus 205 may be classified into an address bus, a data bus, a control bus, and the like. For ease of representation, only one thick line is used to represent the bus in FIG. 14, but this does not mean that there is only one bus or only one type of bus.

The memory 201 may be a volatile memory (volatile memory), for example, a random access memory (random access memory, RAM); or the memory 201 may be a non-volatile memory (non-volatile memory), for example, a read only memory, a flash memory (flash memory), a hard disk (hard disk, HDD), or a solid-state drive (solid-state drive, SSD); or the memory 201 is any other medium that can be configured to carry or store expected program code in a form of an instruction or a data structure and can be accessed by a computer, but is not limited thereto. The memory 201 may be a combination of the foregoing memories.

The processor 202 is configured to invoke the computer program stored in the memory 201 to perform the method for collecting information according to the embodiment corresponding to FIG. 2 to FIG. 6 and/or the method for releasing memory according to the embodiment corresponding to FIG. 7 to FIG. 9 and/or the method for releasing memory according to the embodiment corresponding to FIG. 10 to FIG. 13. For specific method steps, refer to descriptions of corresponding embodiments. Details are not described herein again.

Figure 15:
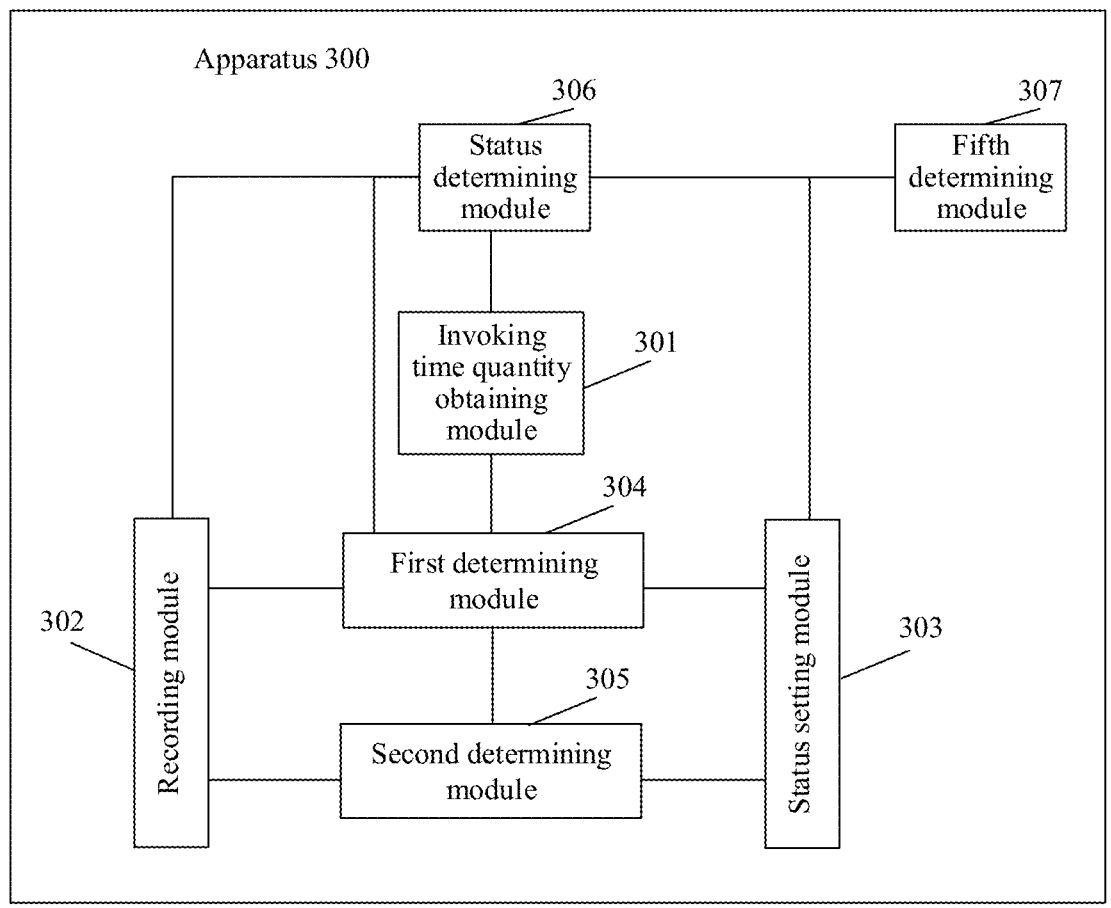
FIG. 15 is a schematic diagram of an apparatus for collecting information according to an embodiment of this application.

An embodiment of this application further provides an apparatus 300 for collecting information, and the apparatus is configured to implement the method described in the embodiment corresponding to FIG. 2 to FIG. 6. For briefly describing corresponding functions of modules of the apparatus and relationships between the modules, related concepts and explanations are not described again. For details, refer to the descriptions of the corresponding method embodiment. As shown in FIG. 15, the apparatus 300 includes:

an invoking time quantity obtaining module 301, configured to: when a quantity of times of invoking a target method in a running lifecycle of a target program increases, obtain, based on a method identifier of the target method, the quantity of times of invoking the target method;

a recording module 302, configured to record method information of the target method based on a first threshold, a second threshold, and the quantity of times of invoking the target method that is obtained by the invoking time quantity obtaining module 301; and a status setting module 303, configured to set a method status of the target method based on the first threshold, the second threshold, and the quantity of times of invoking the target method that is obtained by the invoking time quantity obtaining module 301.

Further, the apparatus 300 further includes: a first determining module 304, configured to determine whether the quantity of times of invoking the target method is greater than the first threshold; and a second determining module 305, configured to: when the first determining module 304 determines that the quantity of times of invoking the target method is less than or equal to the first threshold, determine whether the quantity of times of invoking the target method is greater than the second threshold.

The recording module 302 is specifically configured to: when the first determining module 304 determines that the quantity of times of invoking the target method is greater than the first threshold and the second determining module 305 determines that the quantity of times of invoking the target method is greater than the second threshold, record the method information of the target method.

The status setting module 303 is specifically configured to: when the first determining module 304 determines that the quantity of times of invoking the target method is greater than the first threshold, set the method status of the target method to the first state, and when the second determining module 305 determines that the quantity of times of invoking the target method is greater than the second threshold, set the method status of the target method to the second state.

Further, the apparatus 300 further includes: a status determining module 306, configured to determine the method status of the target method based on the method identifier of the target method.

Further, the apparatus 300 further includes: a fifth determining module 307, configured to: when the status determining module 306 determines that the method status of the target method is the second state, determine whether the quantity of times of invoking the target method is greater than the first threshold.

The recording module 302 is specifically configured to: when the status determining module 306 determines that the method status of the target method does not exist, record the method information of the target method.

The status setting module 303 is specifically configured to: when the status determining module 306 determines that the method status of the target method does not exist, set the method status of the target method, and when the fifth determining module 307 determines that the quantity of times of invoking the target method is greater than the first threshold, set the method status of the target method from the second state to the first state.

Further, the status setting module 303 is specifically configured to call a status setting function to write the method identifier of the target method and the corresponding method status into a shared mapping.

Further, the status determining module 306 is specifically configured to: call a status return function to obtain the method status of the target method from a shared mapping based on the method identifier of the target method; and determine the method status of the target method based on a result returned by the status return function.

Further, the status setting module 303 is further specifically configured to call a status setting function to set the method status of the target method from the second state to the first state.

Further, the recording module 302 is specifically configured to write the method information of the target method into a profile file corresponding to the target program.

Figure 16:
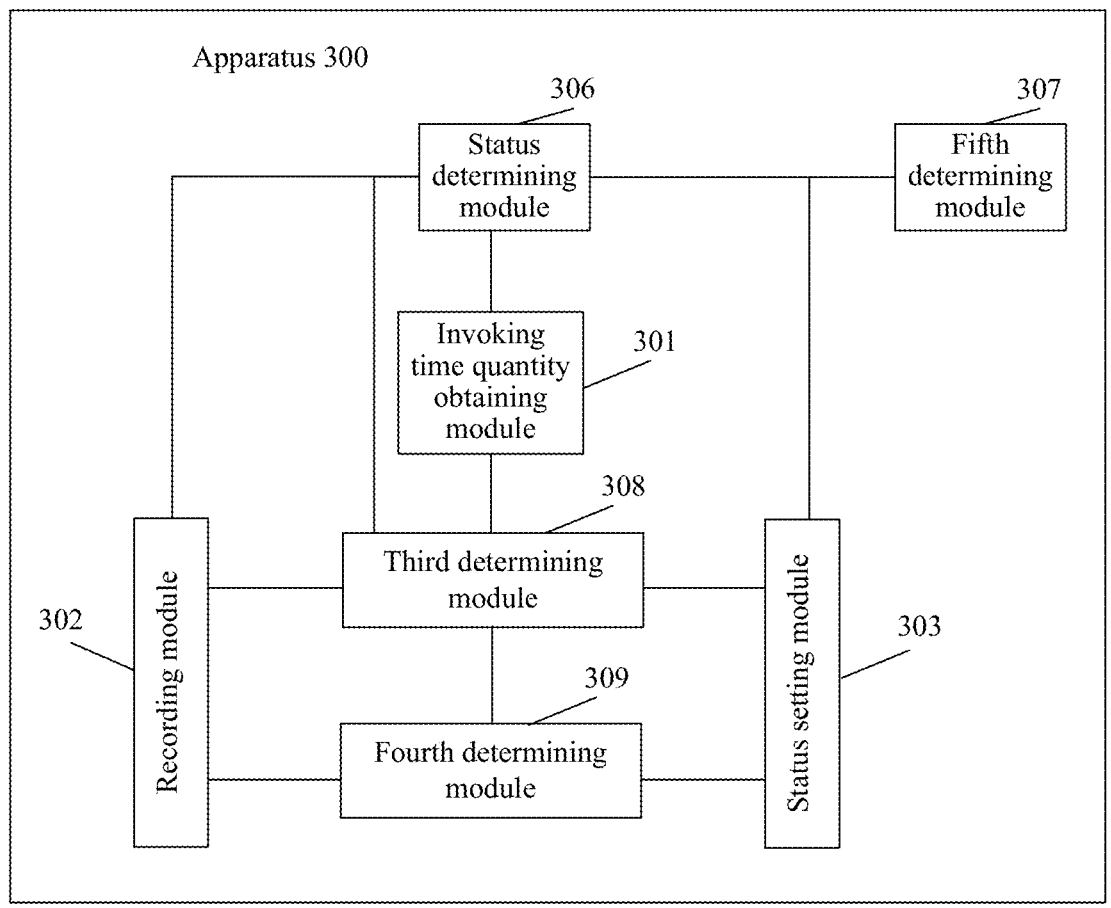
FIG. 16 is a schematic diagram of an apparatus for collecting information according to an embodiment of this application.

Optionally, as shown in FIG. 16, the first determining module 304 of the apparatus 300 is replaced with a third determining module 308, and the second determining module 305 is replaced with a fourth determining module 309; or the first determining module 304, the second determining module 305, a third determining module 308, and a fourth determining module 309 may coexist or may be same modules. In this embodiment of this application, for example, the first determining module 304 is replaced with the third determining module 308, and the second determining module 305 is replaced with the fourth determining module 309.

The third determining module 308 is configured to determine whether the quantity of times of invoking the target method is greater than the second threshold.

The fourth determining module 309 is configured to: when the third determining module 308 determines that the quantity of times of invoking the target method is greater than the second threshold, determine whether the quantity of times of invoking the target method is greater than the first threshold.

The recording module 302 is specifically configured to: when the third determining module 308 determines that the quantity of times of invoking the target method is greater than the second threshold, record the method information of the target method.

The status setting module 303 is specifically configured to: when the fourth determining module 309 determines that the quantity of times of invoking the target method is greater than the first threshold, set the method status of the target method to the first state, and when the fourth determining module 309 determines that the quantity of times of invoking the target method is less than or equal to the first threshold, set the method status of the target method to the second state.

It should be noted that, the third determining module 308 and the first determining module 304 may be a same module, and the fourth determining module 309 and the second determining module 305 may be a same module.

In this embodiment of this application, the apparatus 300 and the terminal device 200 are a same device, and each module of the apparatus 300 is specifically implemented by the processor 202 of the terminal device 200 in the embodiment corresponding to FIG. 14 by invoking the computer program stored in the memory 201.

According to the apparatus for collecting information provided in this embodiment of this application, method information of methods that are invoked frequently can be collected, and in addition, methods corresponding to collected method information are classified. The collection of method information of methods is optimized, and more method information of invoked methods is collected without increasing a workload of compiling the method information into machine-recognizable code.

Figure 17:
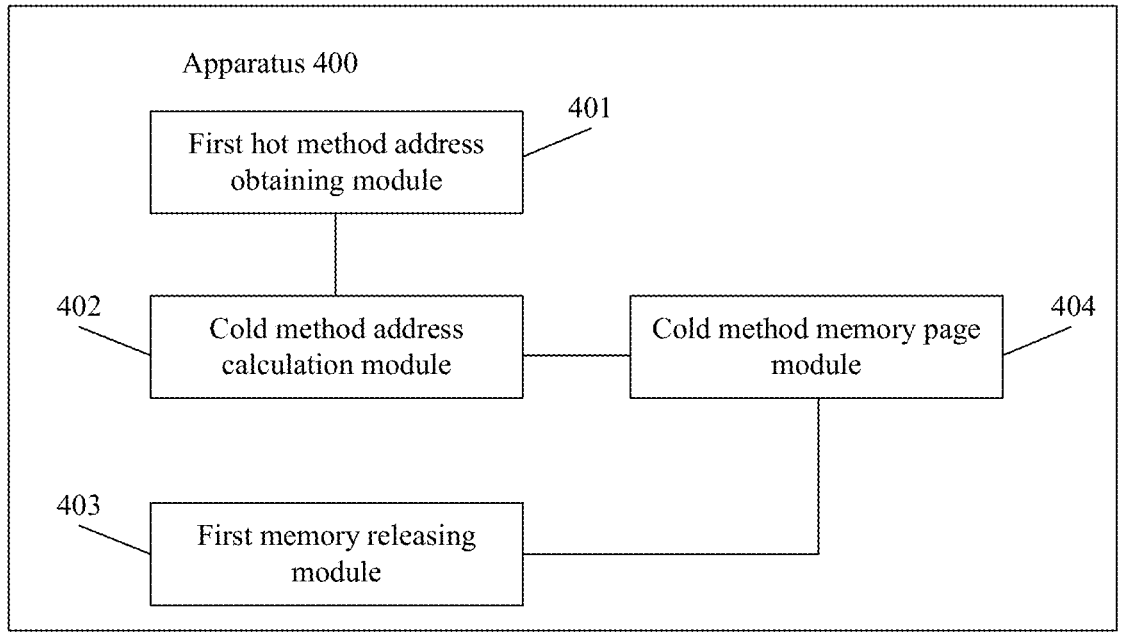
FIG. 17 is a schematic diagram of an apparatus for releasing memory according to an embodiment of this application.

Based on the foregoing embodiment, an embodiment of this application provides an apparatus 400 for releasing memory, and the apparatus is configured to implement the method described in the embodiment corresponding to FIG. 7 to FIG. 9. For briefly describing corresponding functions of modules of the apparatus and relationships between the modules, related concepts and explanations are not described again. For details, refer to the descriptions of the corresponding method embodiment. As shown in FIG. 17, the apparatus 400 includes:

a first hot method address obtaining module 401, configured to obtain a start address and an end address of a hot method in a profile file, where the profile file herein may be obtained by using the terminal device 200 or the apparatus 300 in the foregoing embodiment, or may be obtained by using another apparatus;

a cold method address calculation module 402, configured to calculate a start address and an end address of a cold method based on the start address and the end address of the hot method that are obtained by the first hot method address obtaining module 401; and a first memory releasing module 403, configured to release, based on the start address and the end address of the cold method that are obtained by the cold method address calculation module 402, memory occupied by code of the cold method.

Further, the first hot method address obtaining module 401 is specifically configured to: obtain a method identifier of the hot method; obtain the start address of the hot method based on the method identifier of the hot method; obtain a header of the hot method based on the start address of the hot method; calculate, based on the header of the hot method, a size of memory occupied by code of the hot method; and obtain the end address of the hot method based on the size of the memory occupied by the code of the hot method and the start address of the hot method.

Further, the first hot method address obtaining module 401 is further specifically configured to: after obtaining the method identifier of the hot method, store the method identifier of the hot method in a first set; traverse the first set to obtain the start address of the hot method based on the method identifier of the hot method, and store the start address of the hot method in a second set based on a value of the start address; and after obtaining the end address of the hot method based on the size of the memory occupied by the code of the hot method and the start address of the hot method, store the end address of the hot method in a third set based on a value of the end address.

Further, the cold method address calculation module 402 is specifically configured to calculate the start address and the end address of the cold method based on the second set and the third set that are obtained by the first hot method address obtaining module 401.

Further, the apparatus 400 further includes: a cold method memory page module 404, configured to: calculate, based on the start address and the end address of the cold method that are obtained by the cold method address calculation module 402, a size of the memory occupied by the code of the cold method; and determine a cold method memory page based on a size of a single memory page, the size of the memory occupied by the code of the cold method, and the start address and the end address of the cold method.

The first memory releasing module 403 is specifically configured to release the cold method memory page obtained by the cold method memory page module 404.

Optionally, if the profile file obtained by the apparatus 400 is obtained by using the terminal device 200 or the apparatus 300 described in the foregoing embodiment, for example, in an installed ANDROID operating system, the apparatus 400 further includes: a compilation module, configured to perform ahead-of-time compilation technology AOT compilation on method information of a method whose method status is a first state in the profile file.

In this embodiment of this application, the apparatus 400 and the terminal device 200 are a same device, and each module of the apparatus 400 is specifically implemented by the processor 202 of the terminal device 200 in the embodiment corresponding to FIG. 14 by invoking the computer program stored in the memory 201.

It should be noted that, the apparatus 400 and the apparatus 300 described in the foregoing embodiment may be different apparatuses, or may be integrated into a same apparatus.

According to the apparatus for releasing memory provided in this embodiment of this application, a specific memory page that is occupied by the code of the cold method and needs to be released can be positioned. Therefore, the memory can be accurately released with ensured smooth running of the program.

Figure 18:
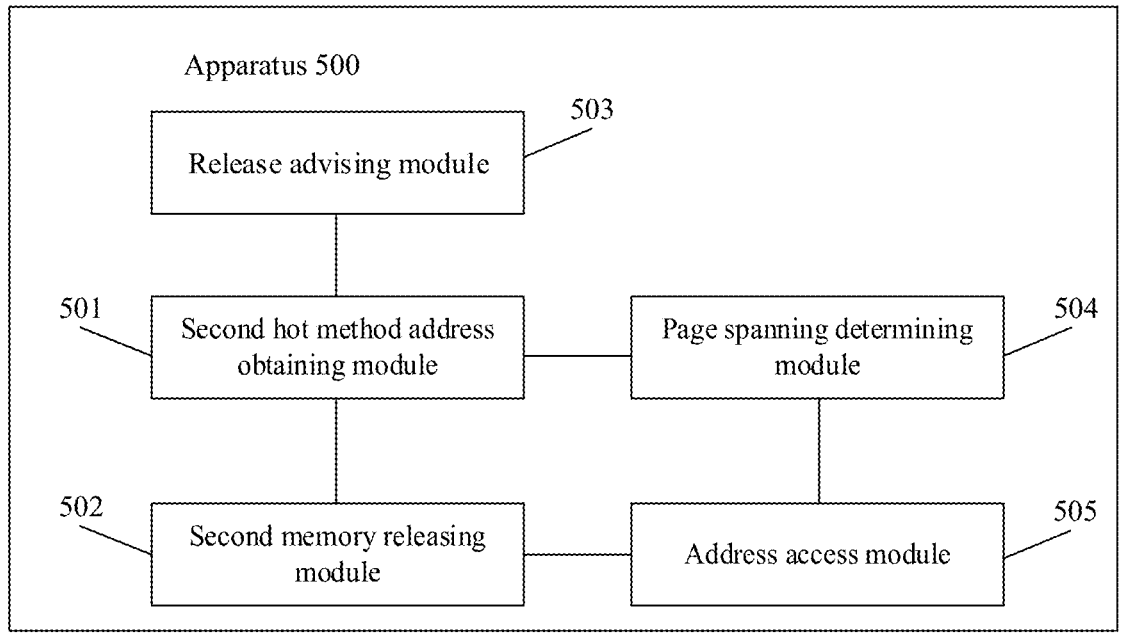
FIG. 18 is a schematic diagram of an apparatus for releasing memory according to an embodiment of this application.

Based on the foregoing embodiment, an embodiment of this application further provides an apparatus 500 for releasing memory, and the apparatus is configured to implement the method described in the embodiment corresponding to FIG. 10 to FIG. 13. For briefly describing corresponding functions of modules of the apparatus and relationships between the modules, related concepts and explanations are not described again. For details, refer to the descriptions of the corresponding method embodiment. As shown in FIG. 18, the apparatus 500 includes:

a second hot method address obtaining module 501, configured to obtain a start address and an end address of a hot method, where a profile file herein may be obtained by using the terminal device 200 or the apparatus 300 in the foregoing embodiment, or may be obtained by using another apparatus; and a second memory releasing module 502, configured to release, based on a size of memory occupied by code of the hot method and the start address and the end address of the hot method that are obtained by the second hot method address obtaining module, code segment memory occupied by a method invoked by the target program.

Optionally, the apparatus 500 further includes a release advising module 503, configured to: before the second hot method address obtaining module 501 obtains the start address and the end address of the hot method, advise releasing memory.

Further, the second hot method address obtaining module 501 is specifically configured to: obtain a method identifier of the hot method; obtain the start address of the hot method based on the method identifier of the hot method; obtain a header of the hot method based on the start address of the hot method; calculate, based on the header of the hot method, the size of the memory occupied by the code of the hot method; and obtain the end address of the hot method based on the size of the memory occupied by the code of the hot method and the start address of the hot method.

Further, the apparatus 500 further includes: a page spanning determining module 504, configured to determine, based on the size of the memory occupied by the code of the hot method and a size of a single memory page, whether page spanning exists in the hot method, where the page spanning is used to indicate that a method occupies code segment memory of at least two memory pages; and an address access module 505, configured to: when the page spanning determining module 504 determines that page spanning exists in the hot method, access the start address, an intermediate address, and the end address of the hot method, and/or when the page spanning determining module 504 determines that page spanning does not exist in the hot method, access the start address and the end address of the hot method, where the intermediate address is used to indicate an address at a distance of N single memory pages from the start address in the same method, and N is a positive integer, where the second memory releasing module 502 is specifically configured to release a memory page that is not accessed by the address access module 505 and that is occupied by a method invoked by the target program.

Optionally, if the profile file obtained by the apparatus 500 is obtained by using the terminal device 200 or the apparatus 300 described in the foregoing embodiment, for example, in an installed ANDROID operating system, the apparatus 500 further includes: a compilation module, configured to perform ahead-of-time compilation technology AOT compilation on method information of a method whose method status is a first state in the profile file.

In this embodiment of this application, the apparatus 500 and the terminal device 200 are a same device, and each module of the apparatus 500 is specifically implemented by the processor 202 of the terminal device 200 in the embodiment corresponding to FIG. 14 by invoking the computer program stored in the memory 201.

It should be noted that, the apparatus 500 and the apparatus 300 described in the foregoing embodiment may be different apparatuses, or may be integrated into a same apparatus. The apparatus 500 and the apparatus 400 may be integrated into a same apparatus.

According to the apparatus for releasing memory provided in this embodiment of this application, memory occupied by code of a cold method (a method that is invoked relatively infrequently) can be accurately released with maintained smooth running of the program.

Based on the foregoing embodiment, an embodiment of this application provides an operating system, the operating system includes a first threshold, a second threshold, and a method status, the first threshold and the second threshold are positive integers, the second threshold is greater than 0 and less than the first threshold, the method status is used to indicate a status of a method, the method status includes a first state and a second state, the first state is used to indicate a state in which a corresponding quantity of times of invoking the method is greater than the first threshold, the second state is used to indicate a state in which a corresponding quantity of times of invoking the method is greater than the second threshold and less than or equal to the first threshold, the quantity of times of invoking is a current quantity of times of invoking the method by a target program in a running lifecycle of the target program, and the target program is any program running in the operating system.

The operating system further includes a shared mapping, a status setting function, and a status return function, where the shared mapping is used to record a correspondence between a method identifier and the method status, and the method identifier is used to indicate the method corresponding to the method identifier; the status setting function is used to write a method identifier and a method status of a same method into the shared mapping or set a method status corresponding to a method identifier of a method in the shared mapping; and the status return function is used to return a corresponding method status based on a method identifier of a method and the shared mapping.

Further, when a quantity of times of invoking a method is greater than the first threshold, the status setting function is used to set a method status of the method to the first state; or when a quantity of times of invoking a method is greater than the second threshold and less than or equal to the first threshold, the status setting function is used to set a method status of the method to the second state.

The operating system provided in this embodiment of this application may implement the method for collecting information according to the embodiment corresponding to FIG. 2 to FIG. 6 and/or the method for releasing memory according to the embodiment corresponding to FIG. 7 to FIG. 9 and/or the method for releasing memory according to the embodiment corresponding to FIG. 10 to FIG. 13.

The following uses an ANDROID operating system installed in a terminal (for example, the mobile phone 100 or the terminal device described in the foregoing embodiment) as an example. In the prior art, each application program of an ANDROID operating system runs on an independent ART (a virtual machine in the ANDROID system, ANDROID Runtime) instance. In a running process of an application program, first, an oat file is loaded into a memory for executing machine code in the oat file. When a method that needs to be invoked is not included in the oat file, the ART loads, into the memory (RAM, Random Access Memory), a dex file corresponding to the method, and interprets and executes a bytecode in the dex file by using an interpreter of the ART. When a quantity of times of invoking the method satisfies a threshold (referred to as a first threshold in the following embodiment), method information of the method is recorded to a profile file. When a condition is satisfied (for example, in a standby state with a lock screen and of being charged for four hours), the ART performs AOT (ahead-of-time compilation technology of an ANDROID Java program, Ahead Of Time) compilation on the dex file of the method corresponding to the method information recorded in the profile file, and updates the oat file. This can accelerate starting and running of the program next time.

To enable the existing ANDROID operating system to implement the method for collecting information according to the embodiment corresponding to FIG. 2 to FIG. 6 and/or the method for releasing memory according to the embodiment corresponding to FIG. 7 to FIG. 9 and/or the method for releasing memory according to the embodiment corresponding to FIG. 10 to FIG. 13, an embodiment of this application provides a method for improving an ANDROID operating system. The method includes: adding a second threshold to a system attribute of the ANDROID operating system, where the second threshold is greater than 0 and less than a first threshold in the ANDROID operating system, and the first threshold and the second threshold are positive integers; adding a method status to a definition of a method class of an ART, where the method status is used to indicate a status of a method, the method status is a first state or a second state, the first state is used to indicate a state in which a quantity of times of invoking the method is greater than the first threshold, the second state is used to indicate a state in which a corresponding quantity of times of invoking the method is greater than the second threshold and less than or equal to the first threshold, and the ART is used to run a program of the ANDROID operating system; and creating a shared mapping from a method identifier to the method status in the ANDROID operating system, where the shared mapping is used to record a correspondence between the method identifier and the method status, and the method identifier is used to indicate the method;

adding a status setting function to the definition of the method class of the ART, where the status setting function is used to write a method identifier and a method status of a same method into the shared mapping; and adding a status return function to the definition of the method class of the ART, where the status return function is used to return, based on the method identifier and the shared mapping, the method status of the method indicated by the method identifier.

Further, when a quantity of times of invoking a method is greater than the first threshold, the status setting function is used to set a method status of the method to the first state; or when a quantity of times of invoking a method is greater than the second threshold and less than or equal to the first threshold, the status setting function is used to set a method status of the method to the second state, where the quantity of times of invoking is a quantity of times of invoking any method by a target program in a running lifecycle of the target program, and the target program is any program running in the ANDROID operating system.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method for collecting information performed by a processor of a device, comprising:

when a quantity of times of invoking a target method of a target program increases, obtaining the quantity of times of invoking the target method based on a method identifier of the target method, wherein the target program is a running program on the device, and wherein the target method is at least one method invoked by the target program; and when the quantity of times of invoking the target method is greater than a first threshold or a second threshold:
  writing target method information of the target method into a profile file corresponding to the target program; and
  setting a method status of the target method, wherein the method status is a first state when the quantity of times of invoking the target method is greater than the first threshold, wherein the method status is a second state when the quantity of times of invoking the target method is greater than the second threshold and less than the first threshold, wherein the first threshold and the second threshold are positive integers, and wherein the second threshold is greater than 0 and less than the first threshold;
obtaining a start address and an end address of a cold method based on a start address of a hot method and a size of memory occupied by code of the hot method, wherein the hot method indicates a first method corresponding to first method information in the profile file, wherein the cold method indicates a second method that is invoked by the target program, and wherein second method information corresponding to the second method is not written into the profile file;
releasing, based on the start address and the end address of the cold method, memory occupied by code of the cold method; and
performing ahead-of-time compilation technology (AOT) compilation on method information of a method with a method status that is the first state in the profile file.

2. The method of claim 1, wherein the writing the target method information of the target method into the profile file corresponding to the target program when the quantity of times of invoking the target method is greater than the first threshold or the second threshold and setting the method status of the target method comprises:
  determining whether the quantity of times of invoking the target method is greater than the first threshold;
  when the quantity of times of invoking the target method is greater than the first threshold;
    recording the target method information of the target method, and
    setting the method status of the target method to the first state; and
  when the quantity of times of invoking the target method is less than or equal to the first threshold;
    determining whether the quantity of times of invoking the target method is greater than the second threshold; and
    when the quantity of times of invoking the target method is greater than the second threshold;
      recording the target method information of the target method; and
      setting the method status of the target method to the second state.

3. The method of claim 1, wherein the writing the target method information of the target method into the profile file corresponding to the target program when the quantity of times of invoking the target method is greater than the first threshold or the second threshold and setting the method status of the target method comprises:
  determining whether the quantity of times of invoking the target method is greater than the second threshold;
  when the quantity of times of invoking the target method is greater than the second threshold, determining whether the quantity of times of invoking the target method is greater than the first threshold; and
  when the quantity of times of invoking the target method is greater than the first threshold;
    recording the target method information of the target method; and
    setting the method status of the target method to the first state;
  when the quantity of times of invoking the target method is less than the first threshold_:
    recording the target method information of the target method; and
    setting the method status of the target method to the second state.

4. The method of claim 2, wherein before the writing the target method information of the target method into the profile file corresponding to the target program when the quantity of times of invoking the target method is greater than the first threshold or the second threshold and setting the method status of the target method, the method further comprises determining the method status of the target method based on the method identifier of the target method.

5. The method of claim 4, further comprising:
  when the method status of the target method does not exist;
    recording the target method information of the target method based on the quantity of times of invoking the target method, the first threshold, and the second threshold; and
    setting the method status of the target method;
  when the method status of the target method is the second state, determining whether the quantity of times of invoking the target method is greater than the first threshold; and
  when the quantity of times of invoking the target method is greater than the first threshold, setting the method status of the target method from the second state to the first state.

6. The method of claim 5, wherein the setting the method status of the target method from the second state to the first state comprises calling a status setting function to set the method status of the target method from the second state to the first state.

7. The method of claim 4, wherein the determining the method status of the target method based on the method identifier of the target method comprises:
  calling a status return function to obtain the method status of the target method from a shared mapping based on the method identifier of the target method, wherein the shared mapping records a correspondence between the method identifier and the method status; and
  determining the method status of the target method based on a result returned by the status return function.

8. The method of claim 1, wherein the setting the method status of the target method comprises calling a status setting function to write the method identifier of the target method and the method status into a shared mapping, wherein the shared mapping records a correspondence between the method identifier and the method status.

9. The method of claim 1, wherein the obtaining the start address and the end address of the hot method in the profile file comprises:
  obtaining a method identifier of the hot method;
  obtaining the start address of the hot method based on the method identifier of the hot method;
  obtaining a header of the hot method based on the start address of the hot method;

calculating, based on the header of the hot method, the size of memory occupied by code of the hot method; and obtaining the end address of the hot method based on the size of the memory occupied by the code of the hot method and the start address of the hot method.

10. The method of claim 9, wherein after the obtaining the hot method identifier of the hot method, the method further comprises storing the method identifier of the hot method in a first set, wherein the obtaining the start address of the hot method based on the method identifier of the hot method comprises:

traversing the first set to obtain the start address of the hot method based on the method identifier of the hot method; and storing the start address of the hot method in a second set based on a value of the start address, and wherein after the obtaining the end address of the hot method based on the size of the memory occupied by the code of the hot method and the start address of the hot method, the method further comprises storing the end address of the hot method in a third set based on a value of the end address.

11. The method of claim 10, wherein the obtaining the start address and the end address of the cold method based on the start address and the end address of the hot method comprises obtaining the start address and the end address of the cold method based on the second set and the third set.

12. The method of claim 11, wherein the releasing, based on the start address and the end address of the cold method, the memory occupied by code of the cold method comprises:

calculating, based on the start address and the end address of the cold method, a size of the memory occupied by the code of the cold method;

determining a cold method memory page based on a size of a single memory page, the size of the memory occupied by the code of the cold method, and the start address and the end address of the cold method, wherein the cold method memory page is a memory page on which a code segment memory is fully occupied by the cold method; and releasing the cold method memory page.

13. The method of claim 1, further comprising:

obtaining the start address and the end address of the hot method; and releasing, based on a size of memory occupied by code of the hot method and the start address and the end address of the hot method, code segment memory occupied by a target method invoked by the target program.

14. The method of claim 13, wherein the obtaining the start address and the end address of the hot method comprises:

obtaining a method identifier of the hot method;

obtaining the start address of the hot method based on the method identifier of the hot method;

obtaining a header of the hot method based on the start address of the hot method;

calculating, based on the header of the hot method, the size of the memory occupied by the code of the hot method; and obtaining the end address of the hot method based on the size of the memory occupied by the code of the hot method and the start address of the hot method.

15. The method of claim 14, wherein the releasing, based on the size of memory occupied by code of the hot method and the start address and the end address of the hot method, the code segment memory occupied by the method invoked by the target program comprises:

determining, based on the size of the memory occupied by the code of the hot method and a size of a single memory page, whether page spanning exists in the hot method, wherein the page spanning indicates that code of a method occupies at least two consecutive memory pages; and when page spanning exists in the hot method;
accessing the start address, an intermediate address, and the end address of the hot method; and
releasing a memory page that is not accessed and that is occupied by the method invoked by the target program, wherein the intermediate address indicates an address at a distance of N single memory pages from the start address in the method invoked by the target program, and wherein N is a positive integer; and when page spanning does not exist in the hot method:
accessing the start address and the end address of the hot method; and
releasing the memory page that is not accessed and that is occupied by the method invoked by the target program.

16. An apparatus for collecting information, comprising:
a memory configured to store instructions; and
a processor coupled to the memory and configured to execute the instructions, which cause the processor to be configured to:

when a quantity of times of invoking a target method of a target program increases, obtain the quantity of times of invoking the target method based on a method identifier of the target method, wherein the target program is a running program on the apparatus, and wherein the target method is at least one method invoked by the target program;

when the quantity of times of invoking the target method is greater than a first threshold or a second threshold:
write target method information of the target method into a profile file corresponding to the target program, wherein the first threshold and the second threshold are positive integers, and wherein the second threshold is greater than 0 and less than the first threshold; and set a method status of the target method, wherein the method status is a first state when the quantity of times of invoking the target method is greater than the first threshold, wherein the method status is a second state when the quantity of times of invoking the target method is greater than the second threshold and less than the first threshold;

obtain a start address and an end address of a cold method based on a start address of a hot method and a size of memory occupied by code of the hot method, wherein the hot method indicates a first method corresponding to first method information in the profile file, wherein the cold method indicates a second method that is invoked by the target program, wherein second method information corresponding to the second method is not written into the profile file;

release, based on the start address and the end address of the cold method, memory occupied by code of the cold method; and perform ahead-of-time compilation technology (AOT) compilation on method information of a method with a method status that is the first state in the profile file.

17. The apparatus of claim 16, wherein the instructions further cause the processor to be configured to:
   determine whether the quantity of times of invoking the target method is greater than the first threshold;
   when the quantity of times of invoking the target method is less than or equal to the first threshold, determine whether the quantity of times of invoking the target method is greater than the second threshold;
   when the quantity of times of invoking the target method is greater than the first threshold and greater than the second threshold, record the target method information of the target method;
   when the quantity of times of invoking the target method is greater than the first threshold, set the method status of the target method to the first state; and
   when the quantity of times of invoking the target method is greater than the first threshold and greater than the second threshold, set the method status of the target method to the second state.

18. The apparatus of claim 17, wherein the instructions further cause the processor to be configured to determine the method status of the target method based on the method identifier of the target method.

19. The apparatus of claim 18, wherein the instructions further cause the processor to be configured to:
   when the method status of the target method is the second state, determine whether the quantity of times of invoking the target method is greater than the first threshold;
   when the method status of the target method does not exist, record the target method information of the target method;
   when the method status of the target method does not exist, set the method status of the target method; and
   when the quantity of times of invoking the target method is greater than the first threshold, set the method status of the target method from the second state to the first state.

20. The apparatus of claim 19, wherein the instructions further cause the processor to be configured to call a status setting function to set the method status of the target method from the second state to the first state.

21. The apparatus of claim 18, wherein the instructions further cause the processor to be configured to:
   call a status return function to obtain the method status of the target method from a shared mapping based on the method identifier of the target method, wherein the shared mapping records a correspondence between the method identifier and the method status; and
   determine the method status of the target method based on a result returned by the status return function.

22. The apparatus of claim 16, wherein the instructions further cause the processor to be configured to:
   determine whether the quantity of times of invoking the target method is greater than the second threshold;
   when the quantity of times of invoking the target method is greater than the second threshold, determine whether the quantity of times of invoking the target method is greater than the first threshold;
   when the quantity of times of invoking the target method is greater than the second threshold, record the method information of the target method;
   when the quantity of times of invoking the target method is greater than the first threshold, set the method status of the target method to the first state; and
   when the quantity of times of invoking the target method is less than or equal to the first threshold, set the method status of the target method to the second state.

23. The apparatus of claim 16, wherein the instructions further cause the processor to be configured to call a status setting function to write the method identifier of the target method and the method status into a shared mapping, wherein the shared mapping records a correspondence between the method identifier and the method status.

24. The apparatus of claim 16, wherein the instructions further cause the processor to be configured to:
   obtain a method identifier of the hot method;
   obtain the start address of the hot method based on the method identifier of the hot method;
   obtain a header of the hot method based on the start address of the hot method;
   calculate, based on the header of the hot method, the size of memory occupied by code of the hot method; and
   obtain the end address of the hot method based on the size of the memory occupied by the code of the hot method and the start address of the hot method.

25. The apparatus of claim 24, wherein the instructions further cause the processor to be configured to:
   store the method identifier of the hot method in a first set;
   traverse the first set to obtain the start address of the hot method based on the method identifier of the hot method;
   store the start address of the hot method in a second set based on a value of the start address; and
   after the end address of the hot method is obtained based on the size of the memory occupied by the code of the hot method and the start address of the hot method, store the end address of the hot method in a third set based on a value of the end address.

26. The apparatus to claim 25, wherein the instructions further cause the processor to be configured to calculate the start address and the end address of the cold method based on the second set and the third set.

27. The apparatus of claim 26, wherein the instructions further cause the processor to be configured to:
   calculate, based on the start address and the end address of the cold method, a size of the memory occupied by the code of the cold method;
   determine a cold method memory page based on a size of a single memory page, the size of the memory occupied by the code of the cold method, and the start address and the end address of the cold method, wherein the cold method memory page is a memory page on which a code segment memory is fully occupied by the cold method; and
   release the cold method memory page.

28. The apparatus of claim 16, wherein the instructions further cause the processor to be configured to:
   obtain the start address and the end address of the hot method; and
   release, based on a size of memory occupied by code of the hot method and the start address and the end address of the hot method, code segment memory occupied by a target method invoked by the target program.

29. The apparatus of claim 28, wherein the instructions further cause the processor to the configured to:
   obtain a method identifier of the hot method;
   obtain the start address of the hot method based on the method identifier of the hot method;
   obtain a header of the hot method based on the start address of the hot method;

calculate, based on the header of the hot method, the size of the memory occupied by the code of the hot method; and obtain the end address of the hot method based on the size of the memory occupied by the code of the hot method and the start address of the hot method.

30. The apparatus of claim 29, wherein the instructions further cause the processor to be configured to:

determine, based on the size of the memory occupied by the code of the hot method and a size of a single memory page, whether page spanning exists in the hot method, wherein the page spanning indicates that a method occupies code segment memory of at least two memory pages; and when page spanning exists in the hot method, access the start address, an intermediate address, and the end address of the hot method;

when page spanning does not exist in the hot method, access the start address and the end address of the hot method, wherein the intermediate address indicates an address at a distance of N single memory pages from the start address in the method invoked by the target program, and wherein N is a positive integer; and release a memory page that is not accessed and that is occupied by the method invoked by the target program.

31. A computer program product comprising instructions that are stored on a non-transitory computer-readable medium and that, when executed by a processor, cause a device to:

when a quantity of times of invoking a target method of a target program increases, obtain the quantity of times of invoking the target method based on a method identifier of the target method, wherein the target program is a running program on the device, and wherein the target method is at least one method invoked by the target program; and when the quantity of times of invoking the target method is larger than a first threshold or a second threshold:

write the target method information of the target method into a profile file corresponding to the target program; and set a method status of the target method, wherein the method status is a first state when the quantity of times of invoking the target method is greater than the first threshold, wherein the method status is a second state when the quantity of times of invoking the target method is greater than the second threshold and less than the first threshold, wherein the first threshold and the second threshold are positive integers, and wherein the second threshold is greater than 0 and less than the first threshold;

obtain a start address and an end address of a cold method based on a start address of a hot method and a size of memory occupied by code of the hot method, wherein the hot method indicates a first method corresponding to first method information in the profile file, wherein the cold method indicates a second method that is invoked by the target program, and wherein second method information correspond o the second method is not written into the profile file;

release, based on the start address and the end address of the cold method, memory occupied by code of the cold method and perform ahead-of-time compilation technology (AOT) compilation on method information of a method with a method status that is the first state in the profile file.

32. The computer program product of claim 31, wherein the instructions further cause the device to determine whether the quantity of times of invoking the target method is greater than the first threshold.

33. The computer program product of claim 31, wherein the instructions further cause the device to determine whether the quantity of times of invoking the target method is greater than the second threshold.

34. The computer program product of claim 31, wherein the instructions further cause the device to determine the method status of the target method based on the method identifier of the target method.

35. The computer program product of claim 31, wherein the instructions further cause the device to obtain a method identifier of the hot method and a method identifier of the cold method.

* * * * *